US012579720B2

(12) United States Patent      (10) Patent No.: US 12,579,720 B2
Kudo                                (45) Date of Patent: Mar. 17, 2026

(54) METHOD OF GENERATING TRAINED MODEL, MACHINE LEARNING SYSTEM, PROGRAM, AND MEDICAL IMAGE PROCESSING APPARATUS

(71) Applicant: FUJIFILM Corporation, Tokyo (JP)

(72) Inventor: Akira Kudo, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 434 days.

(21) Appl. No.: 18/357,986

(22) Filed: Jul. 24, 2023

(65) Prior Publication Data

US 2023/0368442 A1      Nov. 16, 2023

Related U.S. Application Data

(63) Continuation of application No. PCT/JP2022/001351, filed on Jan. 17, 2022.

(30) Foreign Application Priority Data

Jan. 26, 2021     (JP) ................................. 2021-010459

(51) Int. Cl.
 *G06T 11/00*        (2006.01)
 *G06T 3/4053*       (2024.01)
 *G06T 7/11*         (2017.01)

(52) U.S. Cl.
 CPC .......... *G06T 11/008* (2013.01); *G06T 3/4053* (2013.01); *G06T 7/11* (2017.01);
     (Continued)

(58) Field of Classification Search
 CPC . G06T 11/008; G06T 3/4053; G06T 2200/04; G06T 2207/20081;
     (Continued)

(56) References Cited

U.S. PATENT DOCUMENTS 11,475,612 B2 * 10/2022 Lee ........................... G06N 3/08
12,217,387 B2    2/2025 Kudo et al.
         (Continued)

FOREIGN PATENT DOCUMENTS

JP       2018505705       3/2018
JP       2019149094       9/2019
         (Continued)

OTHER PUBLICATIONS

Z. Zhang, L. Yang and Y. Zheng, "Translating and Segmenting Multimodal Medical Volumes with Cycle- and Shape-Consistency Generative Adversarial Network," in 2018 IEEE/CVF Conference on Computer Vision and Pattern Recognition (CVPR), Salt Lake City, UT, USA, 2018, pp. 9242-9251 (Year: 2018).*
         (Continued)

*Primary Examiner* — Utpal D Shah
*Assistant Examiner* — Jack Peter Kraynak
(74) *Attorney, Agent, or Firm* — JCIPRNET

(57)                    ABSTRACT

A method of generating a trained model uses a first generator configured using a three-dimensional convolutional neural network that receives an input of a three-dimensional image of a first domain and that outputs a three-dimensional generated image of a second domain different from the first domain, and a first discriminator configured using a two-dimensional convolutional neural network that receives an input of a two-dimensional image indicating a cross section image in a first slice plane direction cut out from the three-dimensional generated image of the second domain and that discriminates authenticity of the input two-dimensional image. The method includes performing, by a computer, training the first generator and the first discriminator in an adversarial manner based on training data including a three-dimensional image captured under a first imaging condition and a three-dimensional image captured under a
                       (Continued)

second imaging condition different from the first imaging condition.

32 Claims, 27 Drawing Sheets

(52) U.S. Cl.
    CPC ................................. *G06T 2200/04* (2013.01); *G06T 2207/10081* (2013.01); *G06T 2207/10088* (2013.01); *G06T 2207/20081* (2013.01); *G06T 2207/20084* (2013.01); *G06T 2207/20132* (2013.01); *G06T 2207/30004* (2013.01)

(58) Field of Classification Search
    CPC . G06T 2207/20084; G06T 2207/20132; G06T 7/0012; G06T 2207/10081; G06T 2207/10088; G06T 2207/30004; G06T 7/11; G06T 2210/41; G06T 5/60; G06T 2211/441
    See application file for complete search history.

(56) References Cited

U.S. PATENT DOCUMENTS

| | | | |
|---|---|---|---|
| 2017/0372497 A1 | 12/2017 | Hu et al. | |
| 2019/0333219 A1* | 10/2019 | Xu | G06T 11/008 |
| 2019/0362522 A1 | 11/2019 | Han | |
| 2020/0104995 A1 | 4/2020 | Akahori | |
| 2021/0012162 A1* | 1/2021 | Huang | G06V 10/774 |
| 2021/0056734 A1 | 2/2021 | Han | |

FOREIGN PATENT DOCUMENTS

| | | | |
|---|---|---|---|
| JP | 6583875 | 10/2019 | |
| JP | 2019534763 | 12/2019 | |
| JP | 2020054579 | 4/2020 | |
| WO | 2020175446 | 9/2020 | |
| WO | 2020198854 | 10/2020 | |
| WO | WO-2020198854 A1 * | 10/2020 | G06N 3/047 |

OTHER PUBLICATIONS

Kudo, A., Kitamura, Y., Li, Y., Iizuka, S., Simo-Serra, E. (2019). Virtual Thin Slice: 3D Conditional GAN-based Super-Resolution for CT Slice Interval. In: Knoll, F., Maier, A., Rueckert, D., Ye, J. (eds) Machine Learning for Medical Image Reconstruction. MLMIR 2019. Lecture Notes in Computer Science (Year: 2019).*

Uzunova, H., Ehrhardt, J., Jacob, F., Frydrychowicz, A., Handels, H. (2019). Multi-scale GANs for Memory-efficient Generation of High Resolution Medical Images. In: Shen, D., et al. Medical Image Computing and Computer Assisted Intervention—MICCAI 2019 . MICCAI 2019. Lecture Notes in Computer Science (Year: 2019).*

B. Yu, L. Zhou, L. Wang, Y. Shi, J. Fripp and p. Bourgeat, "Ea-GANs: Edge-Aware Generative Adversarial Networks for Cross-Modality MR Image Synthesis," in IEEE Transactions on Medical Imaging, vol. 38, No. 7, pp. 1750-1762, Jul. 2019, doi: 10.1109/TMI.2019.2895894 (Year: 2019).*

J. Cai, Z. Zhang, L. Cui, Y. Zheng, and L. Yang, "Towards cross-modal organ translation and segmentation: A cycle-and shape-consistent generative adversarial network," Med. Image Anal., vol. 52, pp. 174-184, Feb. 2019. (Year: 2019).*

Jun-Yan Zhu et al., "Unpaired Image-to-Image Translation using Cycle-Consistent Adversarial Networks", retrieved from arXiv database, arXiv:1703.10593v7 [cs.CV], Aug. 24, 2020, pp. 1-18.

Zizhao Zhang et al., "Translating and Segmenting Multimodal Medical vols. with Cycle- and Shape-Consistency Generative Adversarial Network", retrieved from arXiv database, arXiv:1802. 09655v2[cs.CV], Mar. 16, 2019, pp. 1-9.

Chikato Yamasoba et al., "Generation and Evaluation of Another Modality of Medical Images Based on GAN", FIT2020 (Forum on Information Technology 2020), Sep. 1, 2020, with English abstract, pp. 277-278, G-006.

"International Search Report (Form PCT/ISA/210) of PCT/JP2022/001351", mailed on Mar. 22, 2022, with English translation thereof, pp. 1-5.

"Written Opinion of the International Searching Authority (Form PCT/ISA/237) of PCT/ JP2022/001351", mailed on Mar. 22, 2022, with English translation thereof, pp. 1-8.

"Office Action of Japan Counterpart Application", issued on Jul. 24, 2025, with English translation thereof, p. 1-p. 6.

"Search Report of Europe Counterpart Application", issued on Jul. 3, 2024, pp. 1-7.

Zizhao Zhang et al., "Translating and Segmenting Multimodal Medical Volumes with Cycle- and Shape-Consistency Generative Adversarial Network", 2018 IEEE/CVF Conference on Computer Vision and Pattern Recognition, Dec. 2018, pp. 9242-9251.

Fausto Milletari et al., "V-Net: Fully Convolutional Neural Networks for Volumetric Medical Image Segmentation", 2016 Fourth International Conference on 3D Vision, Jun. 2016, pp. 565-571.

Dong Nie et al., "Estimating CT Image from MRI Data Using 3D Fully Convolutional Networks", Conference proceedings of Deep Learning and Data Labeling for Medical Applications, Sep. 2016, pp. 1-9.

* cited by examiner

Axial HIGH RESOLUTION

MODALITY A (thick slice)

MRI

Coronal HIGH RESOLUTION

CT

HIGH RESOLUTIONS FOR
ALL CROSS SECTIONS

MODALITY B (thin slice)

PROCESSING AT TIME OF MR INPUT (MR-TO-CT)

FIG. 15

FIG. 16 sagittal            coronal            axial

Figure 21:
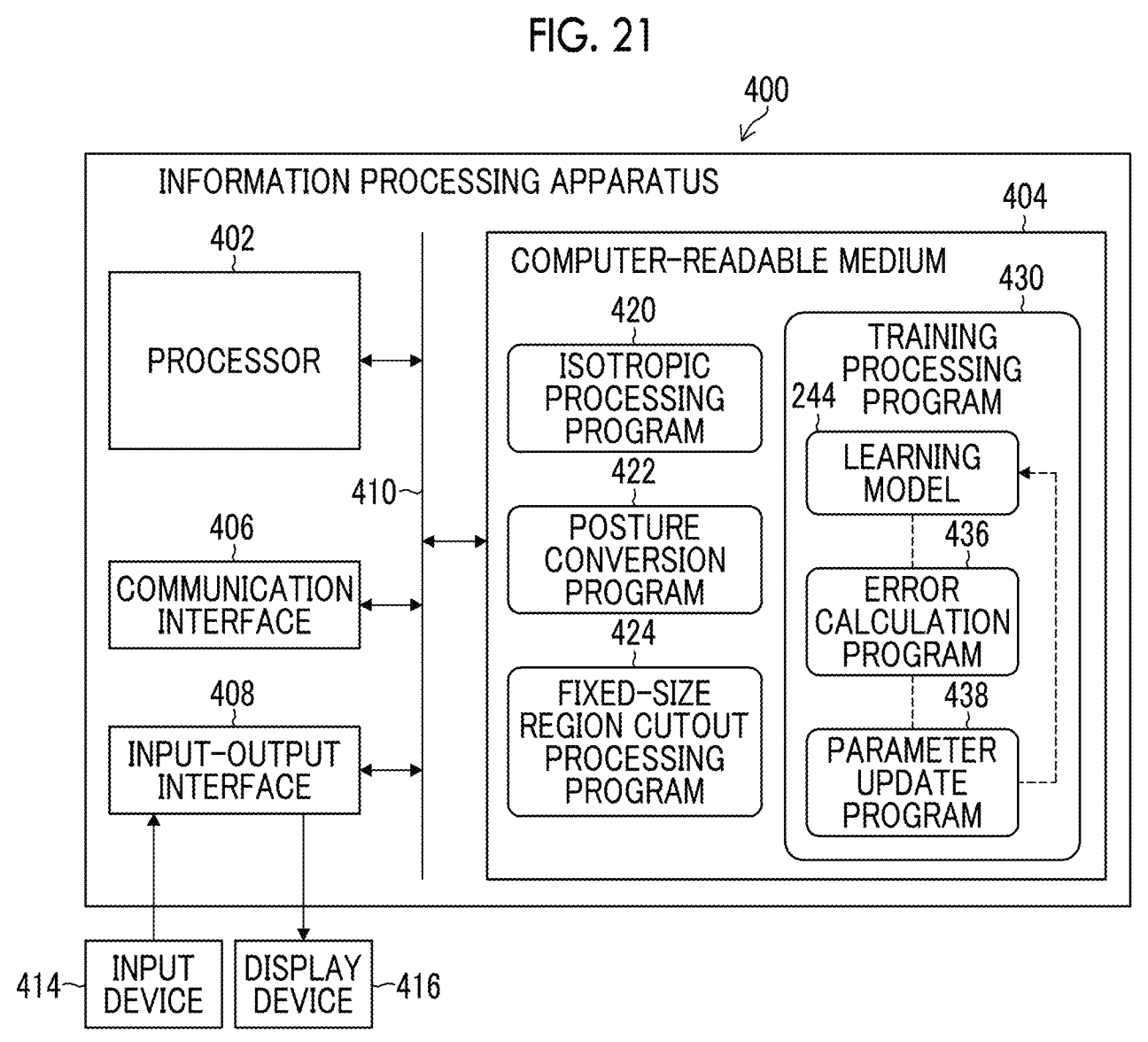

INFORMATION PROCESSING APPARATUS

402 PROCESSOR

410

406 COMMUNICATION INTERFACE

408 INPUT-OUTPUT INTERFACE

416 DISPLAY DEVICE

414 INPUT DEVICE

404 COMPUTER-READABLE MEDIUM

420 ISOTROPIC PROCESSING PROGRAM

422 POSTURE CONVERSION PROGRAM

424 FIXED-SIZE REGION CUTOUT PROCESSING PROGRAM

430 TRAINING PROCESSING PROGRAM

244 LEARNING MODEL

436 ERROR CALCULATION PROGRAM

438 PARAMETER UPDATE PROGRAM

METHOD OF GENERATING TRAINED MODEL, MACHINE LEARNING SYSTEM, PROGRAM, AND MEDICAL IMAGE PROCESSING APPARATUS

CROSS-REFERENCE TO RELATED APPLICATIONS

The present application is a Continuation of PCT International Application No. PCT/JP2022/001351 filed on Jan. 17, 2022 claiming priority under 35 U.S.C § 119(a) to Japanese Patent Application No. 2021-010459 filed on Jan. 26, 2021. Each of the above applications is hereby expressly incorporated by reference, in its entirety, into the present application.

BACKGROUND OF THE INVENTION

1. Field of the Invention

The present invention relates to a method of generating a trained model, a machine learning system, a program, and a medical image processing apparatus, and more particularly, to a machine learning technology and an image processing technology for performing domain conversion of a three-dimensional image.

2. Description of the Related Art

In the medical field, image diagnosis is performed using a medical image captured by various modalities such as a computed tomography (CT) apparatus or a magnetic resonance imaging (MRI) apparatus. In recent years, development of artificial intelligence (AI) for performing extraction of a part such as an organ, detection of a lesion region, classification of a disease name, or the like from a medical image using deep learning has been in progress.

In JP2019-149094A, a diagnosis support system that extracts an organ region from a medical image using AI is described. In JP6583875B, an image processing method of generating high-definition three-dimensional data in which a slice thickness is changed from three-dimensional data having a predetermined slice thickness captured by a modality such as a CT apparatus.

In Jun-Yon Zhu, Taesung Park, Phillip Isola, Alexei A. Efros, "Unpaired Image-to-Image Translation using Cycle-Consistent Adversarial Networks", ArXiv: 1703.10593, a technology for mutually converting images from two different domains without using a pair of images as training data, by using a network obtained by combining two configurations of generative adversarial networks (GANs) is disclosed.

In Zizhao Zhang, Lin Yang, Yefeng Zheng "Translating and Segmenting Multimodal Medical Volumes with Cycle- and Shape-Consistency Generative Adversarial Network", ArXiv: 1802.09655, a method of training tasks of domain conversion and organ region extraction for a three-dimensional medical image by applying the technology of Jun-Yan Zhu, Taesung Park, Phillip Isola, Alexei A. Efros, "Unpaired Image-to-Image Translation using Cycle-Consistent Adversarial Networks", ArXiv: 1703.10593 is proposed.

SUMMARY OF THE INVENTION

Medical images are generated by various modalities, and features of the images are different for each modality. A computer aided diagnosis (computer aided diagnosis, computer aided detection: CAD) system or the like using AI is generally constructed for each modality that captures a target medical image. In a case where a technology constructed by a specific modality can be applied to images of other modalities, utilization in more scenes is expected.

For example, in a case where an organ extraction CAD system that receives a CT image as input and extracts a region of an organ is constructed, based on this technology, applications such as implementing the extraction of a region of an organ from a magnetic resonance (MR) image are also possible.

For this purpose, for example, a high-performance image converter that performs image conversion between heterogeneous modalities, such as processing of generating a pseudo MR image from a CT image, or conversely, processing of generating a pseudo CT image from an MR image, is required. The "image conversion" may be rephrased as "image generation", and the converter may be rephrased as "generator". The modality is understood as a kind of a domain corresponding to a feature of an image.

Since a medical image captured by using the CT apparatus or the MRI apparatus can be three-dimensional data in which two-dimensional slice images are continuous in a slice thickness direction, development of an image converter targeting such a three-dimensional image is desired.

Regarding this point, Jun-Yan Zhu, Taesung Park, Phillip Isola, Alexei A. Efros, "Unpaired Image-to-Image Translation using Cycle-Consistent Adversarial Networks", ArXiv: 1703.10593 describes contents concerning a two-dimensional image and does not describe an application to a three-dimensional image. In Zizhao Zhang, Lin Yang, Yefeng Zheng "Translating and Segmenting Multimodal Medical Volumes with Cycle- and Shape-Consistency Generative Adversarial Network", ArXiv: 1802.09655, a method of training image conversion between different domains for a three-dimensional medical image is proposed. However, in the method described in Zizhao Zhang, Lin Yang, Yefeng Zheng "Translating and Segmenting Multimodal Medical Volumes with Cycle- and Shape-Consistency Generative Adversarial Network", ArXiv: 1802.09655, it is necessary to train a model using a high resolution dataset for each cross section of three types of an axial cross section, a sagittal cross section, and a coronal cross section.

However, in the medical images, there are few cases where high resolution three-dimensional data can be obtained for all three types of cross sections, and there are few cases where data having the same imaging conditions, such as an imaging range and a slice thickness, can be sufficiently obtained in heterogeneous modalities.

On the other hand, there is a case where three-dimensional data in which only one specific cross section has a high resolution among the three types of cross sections can be obtained or where three-dimensional data captured under different imaging conditions can be obtained. For example, three-dimensional data of a thick slice having a large slice thickness, which is widely used in actual clinical practice, has a low resolution in a slice thickness direction, and only one specific cross section among three types of cross sections has a high resolution.

On the other hand, the three-dimensional data of a thin slice having a slice thickness equal to or less than 1 mm has a high resolution in the respective axis directions of the three orthogonal axes (for example, the x axis, the y axis, and the z axis) including the slice thickness direction, and all of the three types of cross sections have high resolutions. Since it takes more time to capture the three-dimensional data of the thin slice and further, the amount of data is larger compared to the thick slice, data of the thick slice is normally acquired in many medical institutions. For this reason, the data of the thick slice is obtainable relatively easily compared to the data of the thin slice.

In a case where a model that performs a task of domain conversion is trained using a deep learning-based algorithm, a feature of a generated image generated by the model depends on data used for training. In a case where the training architecture for two-dimensional images described in Jun-Yan Zhu, Taesung Park, Phillip Isola, Alexei A. Efros, "Unpaired Image-to-Image Translation using Cycle-Consistent Adversarial Networks", ArXiv: 1703.10593 is directly applied to an architecture for three-dimensional images and training is performed using easily obtainable thick slice data as training data, it is difficult to generate a high resolution three-dimensional image for each of the three types of cross sections because the generated image is obtained under the same conditions (thick slice) as the data used for training.

The above-described problems are not limited to medical images, and are perceived as a problem common in a case of implementing domain conversion for three-dimensional images for various purposes.

The present disclosure is conceived in view of such circumstances, and an object of the present disclosure is to provide a method of generating a trained model, a machine learning system, a program, and a medical image processing apparatus capable of generating a high resolution three-dimensional generated image by converting a domain of a three-dimensional image which is input, even in a case where three-dimensional data having a relatively low resolution in some axis directions among three-dimensional axis directions is used for training.

A method of generating a trained model according to an aspect of the present disclosure, the trained model converting a domain of a three-dimensional image which is input, and outputting a three-dimensional generated image of a different domain, in which a learning model is used, which has a structure of a generative adversarial network including a first generator configured using a three-dimensional convolutional neural network that receives an input of a three-dimensional image of a first domain and that outputs a three-dimensional generated image of a second domain different from the first domain, and a first discriminator configured using a two-dimensional convolutional neural network that receives an input of a two-dimensional image indicating a cross section image in a first slice plane direction cut out from the three-dimensional generated image of the second domain generated by the first generator and that discriminates authenticity of the input two-dimensional image, and the method comprises: by a computer, acquiring a plurality of pieces of training data including a three-dimensional image captured under a first imaging condition and a three-dimensional image captured under a second imaging condition different from the first imaging condition; and performing training processing of training the first generator and the first discriminator in an adversarial manner based on the plurality of pieces of training data.

According to this aspect, in a case where the authenticity discrimination of whether the three-dimensional generated image generated by the first generator is a real image (actual image) or a fake image (generated image) is performed, the three-dimensional generated image can be divided into two-dimensional images of cross section images in which the slice plane direction having a relatively high resolution in the training data as the real image is set as the first slice plane direction and can input it to the first discriminator. Accordingly, even in a case where the resolution of the cross section image in the first slice plane direction is low in the three-dimensional image used for input to the first generator, the first generator is trained so as to be able to generate a three-dimensional generated image in which the resolution of the cross section image in the first slice plane direction is high. The trained first generator can be used as a trained model that performs a task of heterogeneous domain image generation for converting the domain of the three-dimensional image.

The method of generating the trained model is understood as a method of producing the trained model. In addition, the method of generating the trained model may be understood as a machine learning method executed by using a computer. The resolution may be rephrased as a spatial resolution.

In the method of generating a trained model according to another aspect of the present disclosure, the method may further include, by the computer, performing first cutout processing of cutting out the two-dimensional image indicating the cross section image in the first slice plane direction from the three-dimensional generated image of the second domain generated by the first generator, and inputting the two-dimensional image cut out by the first cutout processing to the first discriminator.

In the method of generating a trained model according to still another aspect of the present disclosure, the first imaging condition may include that an apparatus used for imaging is a first imaging apparatus, and the second imaging condition may include that the apparatus used for imaging is a second imaging apparatus of a different type from the first imaging apparatus.

In the method of generating a trained model according to still yet another aspect of the present disclosure, the first imaging condition may include that a resolution condition is a first resolution condition, and the second imaging condition may include that the resolution condition is a second resolution condition different from the first resolution condition.

In the method of generating a trained model according to still yet another aspect of the present disclosure, at least one of the first imaging condition or the second imaging condition may include that a resolution in a direction of one axis among three orthogonal axes is lower than a resolution in each of directions of the other two axes as a resolution condition.

In the method of generating a trained model according to still yet another aspect of the present disclosure, anisotropic three-dimensional data in which a resolution in a direction of one axis among three orthogonal axes is lower than a resolution in each of directions of the other two axes is used as the three-dimensional image captured under the second imaging condition, and the first slice plane direction is a slice plane direction parallel to the directions of the other two axes in which a resolution is relatively high in the anisotropic three-dimensional data.

In the method of generating a trained model according to still yet another aspect of the present disclosure, the learning model may further include a second discriminator configured using the two-dimensional convolutional neural network that receives an input of a two-dimensional image indicating a cross section image in a second slice plane direction orthogonal to the first slice plane direction which is cut out from the three-dimensional generated image of the second domain generated by the first generator and that discriminates authenticity of the input two-dimensional image, and the training processing includes processing of training the first generator and the second discriminator in an adversarial manner.

In the method of generating a trained model according to still yet another aspect of the present disclosure, the method may further include, by the computer, performing second cutout processing of cutting out the two-dimensional image indicating the cross section image in the second slice plane direction from the three-dimensional generated image of the second domain generated by the first generator, and inputting the two-dimensional image cut out by the second cutout processing to the second discriminator.

In the method of generating a trained model according to still yet another aspect of the present disclosure, as the training data, z-axis low resolution anisotropic three-dimensional data in which a resolution in a z-axis direction among three orthogonal axes of an x axis, a y axis, and a z axis is lower than a resolution in each of an x-axis direction and a y-axis direction, and y-axis low resolution anisotropic three-dimensional data in which a resolution in the y-axis direction is lower than a resolution in each of the z-axis direction and the x-axis direction may be used, the first slice plane direction may be a slice plane direction parallel to the x-axis direction and the y-axis direction, and the second slice plane direction may be a slice plane direction parallel to the z-axis direction and the x-axis direction.

In the method of generating a trained model according to still yet another aspect of the present disclosure, as the training data, y-axis low resolution anisotropic three-dimensional data in which a resolution in a y-axis direction among three orthogonal axes of an x axis, a y axis, and a z axis is lower than a resolution in each of a z-axis direction and an x-axis direction, and x-axis low resolution anisotropic three-dimensional data in which a resolution in the x-axis direction is lower than a resolution in each of the y-axis direction and the z-axis direction may be used, the first slice plane direction may be a slice plane direction parallel to the z-axis direction and the x-axis direction, and the second slice plane direction may be a slice plane direction parallel to the y-axis direction and the z-axis direction.

In the method of generating a trained model according to still yet another aspect of the present disclosure, as the training data, x-axis low resolution anisotropic three-dimensional data in which a resolution in an x-axis direction among three orthogonal axes of an x axis, a y axis, and a z axis is lower than a resolution in each of a y-axis direction and a z-axis direction, and z-axis low resolution anisotropic three-dimensional data in which a resolution in the z-axis direction is lower than a resolution in each of the x-axis direction and the y-axis direction may be used, the first slice plane direction may be a slice plane direction parallel to the y-axis direction and the z-axis direction, and the second slice plane direction may be a slice plane direction parallel to the x-axis direction and the y-axis direction.

In the method of generating a trained model according to still yet another aspect of the present disclosure, the computer may selectively switch between the first discriminator and the second discriminator which are used for authenticity discrimination of the three-dimensional generated image of the second domain according to a resolution condition of the training data, which is input.

In the method of generating a trained model according to still yet another aspect of the present disclosure, anisotropic three-dimensional data in which a resolution in a direction of one axis among three orthogonal axes is lower than a resolution in each of directions of the other two axes may be used as the three-dimensional image captured under the first imaging condition.

In the method of generating a trained model according to still yet another aspect of the present disclosure, the method may further include, by the computer, performing first isotropic processing of converting the three-dimensional image captured under the first imaging condition into isotropic three-dimensional data having an equal resolution in each of axis directions of three orthogonal axes, and inputting the isotropic three-dimensional data after the conversion by the first isotropic processing to the first generator.

In the method of generating a trained model according to still yet another aspect of the present disclosure, the first generator may receive an input of isotropic three-dimensional data having an equal resolution in each of axis directions of three orthogonal axes, and output the isotropic three-dimensional data as the three-dimensional generated image.

In the method of generating a trained model according to still yet another aspect of the present disclosure, the learning model may further include a second generator configured using the three-dimensional convolutional neural network that receives an input of the three-dimensional image of the second domain and that outputs a three-dimensional generated image of the first domain, and a third discriminator configured using the two-dimensional convolutional neural network that receives an input of a two-dimensional image indicating a cross section image in a specific slice plane direction which is cut out from the three-dimensional generated image of the first domain generated by the second generator and that discriminates authenticity of the input two-dimensional image, and the training processing includes processing of training the second generator and the third discriminator in an adversarial manner.

This aspect may be an application of a mechanism of a so-called CycleGAN described in Jun-Yan Zhu, Taesung Park, Phillip Isola, Alexei A. Efros, "Unpaired Image-to-Image Translation using Cycle-Consistent Adversarial Networks", ArXiv: 1703.10593.

In the method of generating a trained model according to still yet another aspect of the present disclosure, the method may further include, by the computer, performing third cutout processing of cutting out the two-dimensional image indicating the cross section image in the specific slice plane direction from the three-dimensional generated image of the first domain generated by the second generator, and inputting the two-dimensional image cut out by the third cutout processing to the third discriminator.

In the method of generating a trained model according to still yet another aspect of the present disclosure, the method may further include, by the computer, performing processing of calculating a first reconstruction loss of conversion processing using the first generator and the second generator in this order based on a first reconstructed generated image output from the second generator by inputting the three-dimensional generated image of the second domain output from the first generator to the second generator, and processing of calculating a second reconstruction loss of conversion processing using the second generator and the first generator in this order based on a second reconstructed generated image output from the first generator by inputting the three-dimensional generated image of the first domain output from the second generator to the first generator.

In the method of generating a trained model according to still yet another aspect of the present disclosure, the method may further include, by the computer, performing first average pooling processing of converting the first reconstructed generated image into three-dimensional data having the same resolution as original training data used for the input to the first generator in a case where the first reconstructed generated image is generated, and calculating the first reconstruction loss based on the three-dimensional data after the conversion by the first average pooling processing and the original training data used for the input to the first generator.

In the method of generating a trained model according to still yet another aspect of the present disclosure, the method may further include, by the computer, performing second average pooling processing of converting the second reconstructed generated image into three-dimensional data having the same resolution as original training data used for the input to the second generator in a case where the second reconstructed generated image is generated, and calculating the second reconstruction loss based on the three-dimensional data after the conversion by the second average pooling processing and the original training data used for the input to the second generator.

In the method of generating a trained model according to still yet another aspect of the present disclosure, the learning model may further include a fourth discriminator configured using the two-dimensional convolutional neural network that receives an input of a two-dimensional image indicating a cross section image in a slice plane direction orthogonal to the specific slice plane direction which is cut out from the three-dimensional generated image of the first domain generated by the second generator and that discriminates authenticity of the input two-dimensional image, and the training processing includes processing of training the second generator and the fourth discriminator in an adversarial manner.

In the method of generating a trained model according to still yet another aspect of the present disclosure, the method may further include, by the computer, performing fourth cutout processing of cutting out the two-dimensional image indicating the cross section image in the slice plane direction orthogonal to the specific slice plane direction from the three-dimensional generated image of the first domain generated by the second generator, and inputting the two-dimensional image cut out by the fourth cutout processing to the fourth discriminator.

In the method of generating a trained model according to still yet another aspect of the present disclosure, the specific slice plane direction may be the first slice plane direction.

In the method of generating a trained model according to still yet another aspect of the present disclosure, the method may further include, by the computer, performing second isotropic processing of converting the three-dimensional image captured under the second imaging condition into isotropic three-dimensional data having an equal resolution in each of axis directions of three orthogonal axes, and inputting the isotropic three-dimensional data after the conversion by the second isotropic processing to the second generator.

In the method of generating a trained model according to still yet another aspect of the present disclosure, the first imaging condition may correspond to the first domain, and the second imaging condition may correspond to the second domain.

In the method of generating a trained model according to still yet another aspect of the present disclosure, the three-dimensional image captured under the first imaging condition may be a first modality image captured using a first modality which is a medical apparatus, the three-dimensional image captured under the second imaging condition may be a second modality image captured using a second modality which is a medical apparatus of a different type from the first modality, and the learning model may receive an input of the first modality image and may be trained to generate a pseudo second modality generated image having a feature of the image captured using the second modality.

In the method of generating a trained model according to still yet another aspect of the present disclosure, the first domain may be a first resolution, and the second domain may be a second resolution higher than the first resolution.

In the method of generating a trained model according to still yet another aspect of the present disclosure, the three-dimensional image captured under the first imaging condition may be first axis low resolution three-dimensional data in which a resolution in a first axis direction among three orthogonal axes is lower than a resolution in each of the other two axis directions, the three-dimensional image captured under the second imaging condition may be second axis low resolution three-dimensional data in which a resolution in a second axis direction different from the first axis direction among the three orthogonal axes is lower than a resolution in the other two axis directions, and the learning model may receive an input of at least one of the first axis low resolution three-dimensional data or the second axis low resolution three-dimensional data and may be trained to generate isotropic three-dimensional data having a higher resolution than that of the input three-dimensional data.

In the method of generating a trained model according to still yet another aspect of the present disclosure, the method may further include, by the computer, performing resolution reduction processing of reducing a resolution of the three-dimensional generated image of the first domain generated by the first generator, and calculating a reconstruction loss of image conversion by super-resolution processing by the first generator and the resolution reduction processing based on a reconstructed generated image obtained by the resolution reduction processing.

A machine learning system according to still yet another aspect of the present disclosure, for training a learning model that converts a domain of a three-dimensional image which is input, and generates a three-dimensional generated image of a different domain, the system comprises at least one first processor, and at least one first storage device in which a program executed by the at least one first processor is stored, in which the learning model having a structure of a generative adversarial network including a first generator configured using a three-dimensional convolutional neural network that receives an input of a three-dimensional image of a first domain and that outputs a three-dimensional generated image of a second domain different from the first domain, and a first discriminator configured using a two-dimensional convolutional neural network that receives an input of a two-dimensional image indicating a cross section image in a first slice plane direction cut out from the three-dimensional generated image of the second domain generated by the first generator and that discriminates authenticity of the input two-dimensional image, and the at least one first processor, by executing an instruction of the program, acquires a plurality of pieces of training data including a three-dimensional image captured under a first imaging condition and a three-dimensional image captured under a second imaging condition different from the first imaging condition, and performs training processing of training the first generator and the first discriminator in an adversarial manner based on the plurality of pieces of training data.

A program according to still yet another aspect of the present disclosure, causing a computer to execute processing of training a learning model that converts a domain of a three-dimensional image which is input, and generates a three-dimensional generated image of a different domain, in which the learning model has a structure of a generative adversarial network including a first generator configured using a three-dimensional convolutional neural network that receives an input of a three-dimensional image of a first domain and that outputs a three-dimensional generated image of a second domain different from the first domain, and a first discriminator configured using a two-dimensional convolutional neural network that receives an input of a two-dimensional image indicating a cross section image in a first slice plane direction cut out from the three-dimensional generated image of the second domain generated by the first generator and that discriminates authenticity of the input two-dimensional image, and the program causes the computer to execute: acquiring a plurality of pieces of training data including a three-dimensional image captured under a first imaging condition and a three-dimensional image captured under a second imaging condition different from the first imaging condition; and performing training processing of training the first generator and the first discriminator in an adversarial manner based on the plurality of pieces of training data.

A medical image processing apparatus according to still yet another aspect of the present disclosure, the apparatus comprises a second storage device that stores a first trained model which is a trained first generator that has been trained by implementing the method of generating a trained model according to the present disclosure, and a second processor that performs image processing using the first trained model, in which the first trained model is a model that receives an input of a first medical image and is trained to output a second medical image of a domain different from the first medical image.

According to the present invention, it is possible to generate a high resolution three-dimensional generated image having a feature of a heterogeneous domain by converting a domain of an input three-dimensional image.

BRIEF DESCRIPTION OF THE DRAWINGS

FIG. 10 is a conceptual diagram illustrating an outline of processing in a machine learning system 100 that trains a task of MR-to-CT domain conversion.

FIG. 12 is a functional block diagram illustrating a configuration example of a machine learning system according to the second embodiment.

FIG. 13 is a schematic diagram illustrating a processing flow at the time of CT input in the machine learning system according to the second embodiment.

FIG. 14 is a schematic diagram illustrating a processing flow at the time of MR input in the machine learning system according to the second embodiment.

FIG. 15 is a schematic diagram illustrating a processing flow in a case where an MR image of a thick slice having a high resolution axial cross section is input.

FIG. 16 is a schematic diagram illustrating a processing flow in a case where an MR image of a thick slice having a high resolution coronal cross section is input.

FIG. 21 is a block diagram illustrating a configuration example of an information processing apparatus applied to the machine learning system.

FIG. 22 is a block diagram illustrating a configuration example of a medical image processing apparatus using the trained generator generated by performing training using the machine learning system.

FIG. 26 is a schematic diagram illustrating a processing flow in a case where a three-dimensional image of which a coronal cross section has a high resolution is input in the machine learning system according to the fourth embodiment.

DESCRIPTION OF THE PREFERRED EMBODIMENTS

Hereinafter, a preferred embodiment of the present invention will be described in accordance with the appended drawings.

Example of Medical Image

A modality, such as a CT apparatus or an MRI apparatus, is exemplified as a representative example of an apparatus that captures a medical image. In these modalities, as a basic concept, three-dimensional data indicating a three-dimensional form of an object is obtained by continuously capturing two-dimensional slice images. In the present specification, the term "three-dimensional data" includes a concept of an aggregate of two-dimensional slice images continuously captured, and is synonymous with a three-dimensional image. The term "image" includes the meaning of image data. The aggregate of continuous two-dimensional slice images may be referred to as a "two-dimensional image sequence" or a "two-dimensional image series". The term "two-dimensional image" includes a concept of a two-dimensional slice image extracted from the three-dimensional data.

As a cross section (two-dimensional slice cross section) obtained by reconstructing data from an imaging apparatus such as a CT apparatus or an MRI apparatus, three types of an axial cross section, a sagittal cross section, and a coronal cross section are considered.

Figure 1:
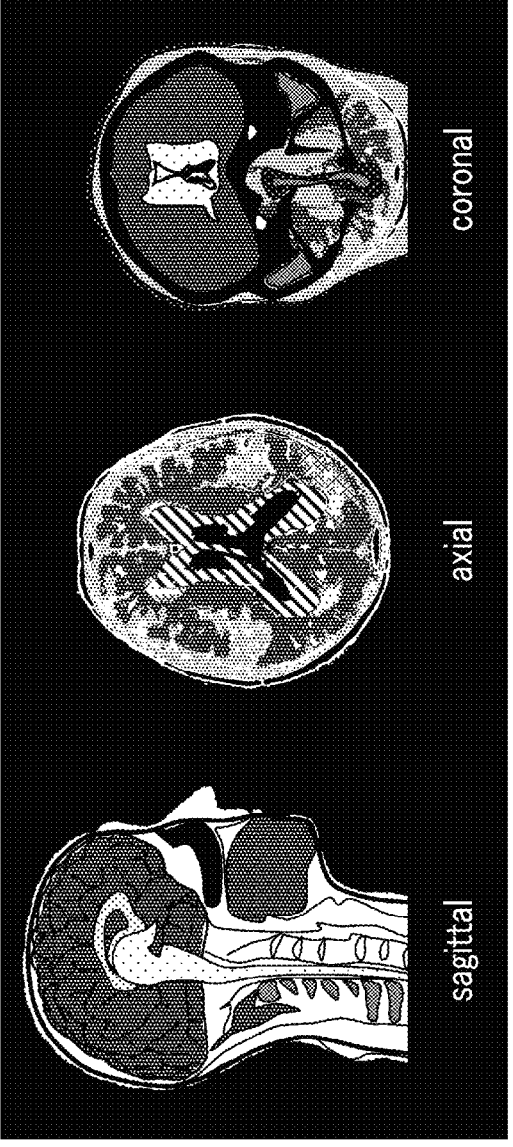
FIG. 1 is an image example of each of three types of cross sections cut out from a three-dimensional form image of a brain captured by an MRI apparatus.

FIG. 1 is an image example of each of three types of cross sections cut out from a three-dimensional form image of a brain captured by an MRI apparatus. In FIG. 1, a sagittal cross section image is illustrated from the left, an axial cross section image is illustrated in the center, and a coronal cross section image is illustrated on the right. In the present specification, an orthogonal coordinate system is introduced in which a body axis direction is a z-axis direction, a horizontal direction (left-right direction) of a human body in a standing posture is an x-axis direction, and a depth direction (front-rear direction) is a y-axis direction. The axial cross section is a cross section (xy plane) orthogonal to a z axis, that is, a plane parallel to the x-axis direction and the y-axis direction. The sagittal cross section is a cross section (yz plane) orthogonal to an x axis. The coronal cross section is a cross section (zx plane) orthogonal to a y axis.

Figure 2:
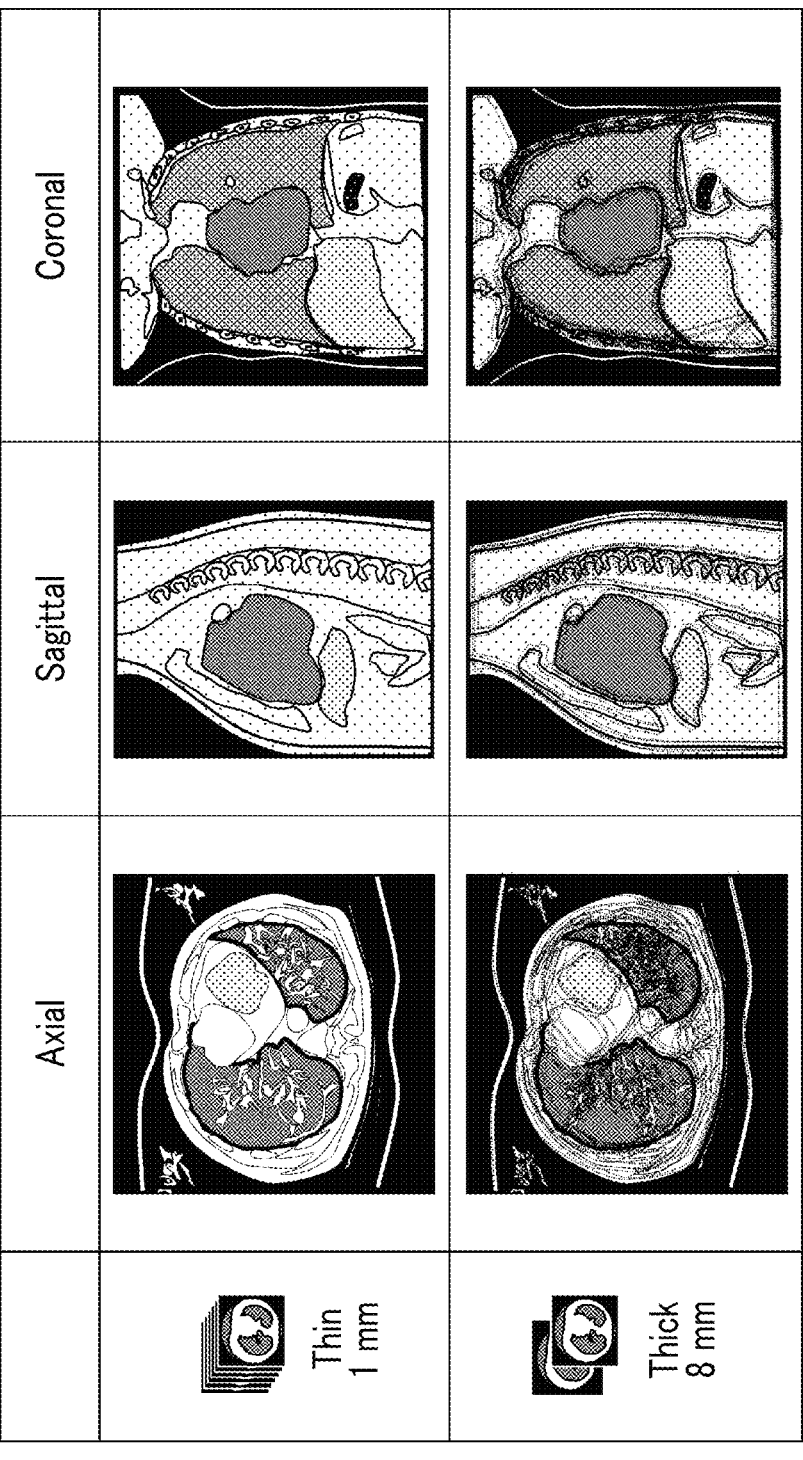
FIG. 2 is an image example illustrating a representation difference between a thin slice and a thick slice in a CT image.

FIG. 2 is an image example illustrating a representation difference between a thin slice and a thick slice in a CT image. The upper part of FIG. 2 illustrates an image example of each of three types of cross sections in a case where a thin slice having a slice thickness of 1 mm is reconstructed in the axial cross section. The lower part of FIG. 2 illustrates an image example of each of three types of cross sections in a case where a thick slice having a slice thickness of 8 mm is reconstructed in the axial cross section. In FIG. 2, the left side is an image example of the axial cross section, the center is an image example of the sagittal cross section, and the right side is an image example of the coronal cross section.

In a case of the thin slice illustrated in the upper part of FIG. 2, high resolution images are obtained for all three types of cross sections. On the other hand, in a case of the thick slice illustrated in the lower part, a high resolution image is obtained for the axial cross section, but since slice information of 8 mm thickness is averaged for other cross sections, the resolution of the images of the sagittal cross section and the coronal cross section is reduced.

Problem of Image Generation by Domain Conversion for Medical Image

In a case of training a task of domain conversion (here, heterogeneous modality image generation) for a medical image using a deep learning-based algorithm, as described above, collection of data used for training is one of problems. In the heterogeneous modalities, it is difficult to sufficiently gather data obtained by imaging the same imaging range under the same resolution condition. In many cases, the conditions of the resolution at the time of imaging are different for each modality.

Figure 3:
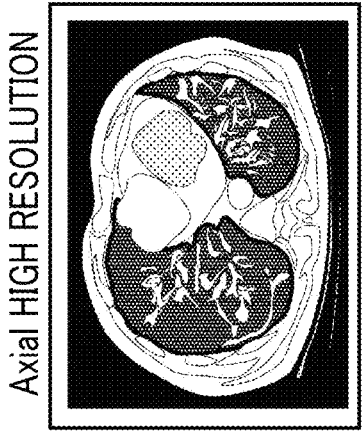
FIG. 3 is an example of an MR image of a thick slice captured by using the MRI apparatus.
Figure 3:
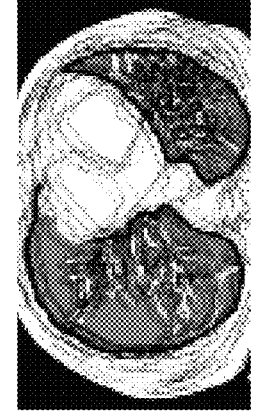
Figure 3:
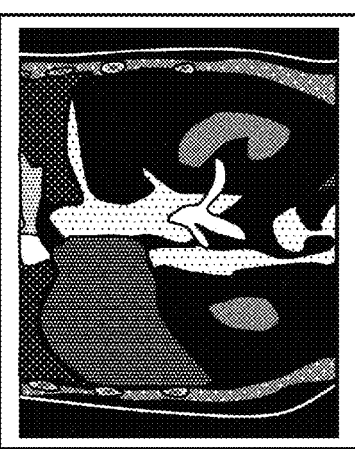
Figure 4:
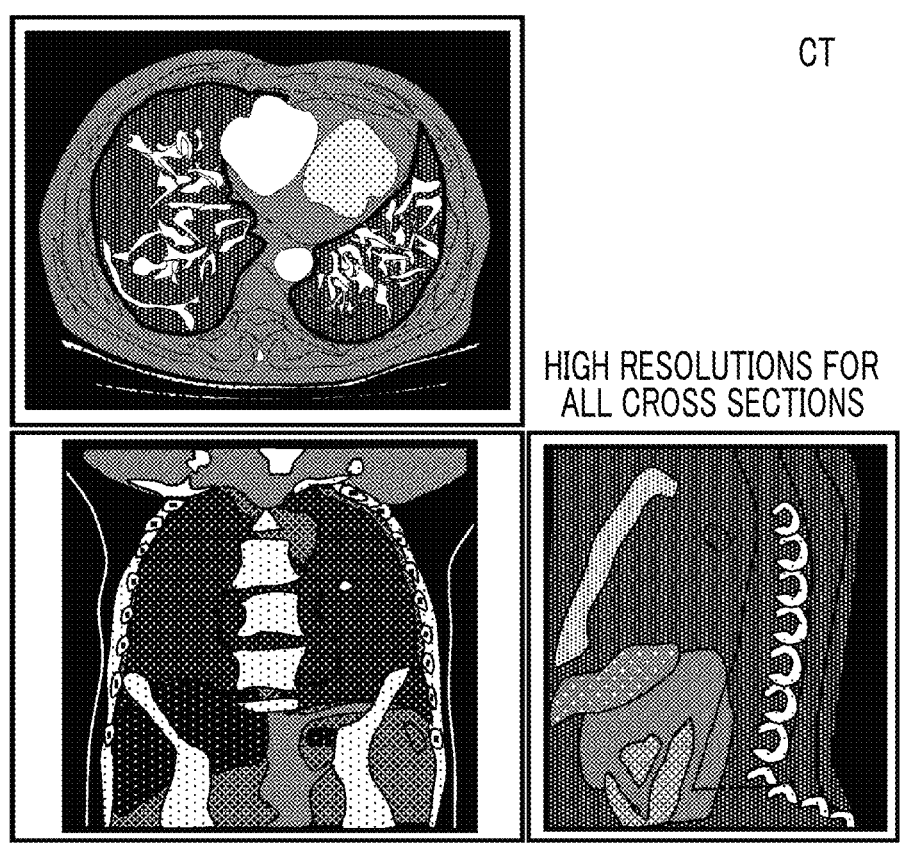
FIG. 4 is an example of a CT image of a thin slice captured by using a CT apparatus.

FIGS. 3 and 4 illustrate examples in which the resolution of the images is different between the modalities. In FIG. 3, an example of a thick slice of MR as a modality A is illustrated, and in FIG. 4, an example of a thin slice of CT as a modality B is illustrated.

Three images illustrated on the left side of FIG. 3 are examples of MR images in which the thick slices with a high resolution in the coronal cross section are reconstructed, and the three images illustrated on the right side of FIG. 3 are examples of MR images in which the thick slices with a high resolution in the axial cross section are reconstructed. The MR image captured by the MRI apparatus may be three-dimensional data in which only the coronal cross section has a high resolution and both the axial cross section and the sagittal cross section have low resolutions, or may be three-dimensional data in which only the axial cross section has a high resolution and both the coronal cross section and the sagittal cross section have low resolutions.

The three-dimensional data in which only the coronal cross section has a high resolution is data in which the resolution in the x-axis direction and the z-axis direction are high and the resolution in the y-axis direction is low. On the other hand, the three-dimensional data in which only the axial cross section has a high resolution is data in which the resolution in the x-axis direction and the y-axis direction are high and the resolution in the z-axis direction is low.

In the case of the MR image (actual MR image) acquired by actual imaging as described above, in many cases, only one cross section among the three types of cross sections has a high resolution and the other two cross sections have low resolutions. The MR image may include various types of images, such as a T1 weighted image, a T2 weighted image, a HeavyT2 weighted image, and a diffusion weighted image.

On the other hand, as illustrated in FIG. 4, the three-dimensional data of the thin slice obtained by imaging using the CT apparatus can be data having a high resolution for all cross sections of three types of cross sections (for all axis directions of three axes).

A difference in resolution in each axis direction in the three-dimensional data as illustrated in FIGS. 3 and 4 depends on imaging conditions in a case of acquiring the three-dimensional data. Even in the CT apparatus, in a case of performing imaging with the thick slice, three-dimensional data in which only a cross section in a specific direction has a high resolution is obtained, as illustrated in FIG. 3.

First Embodiment

In the first embodiment, an example of a machine learning system will be described which implements heterogeneous domain image generation (image conversion) capable of obtaining a generated image having a high resolution for all directions of three axes (that is, each of three types of cross sections), even in a case of using a training dataset in which low resolution three-dimensional data in some axis directions as illustrated in FIG. 3 is mixed.

Figure 5:
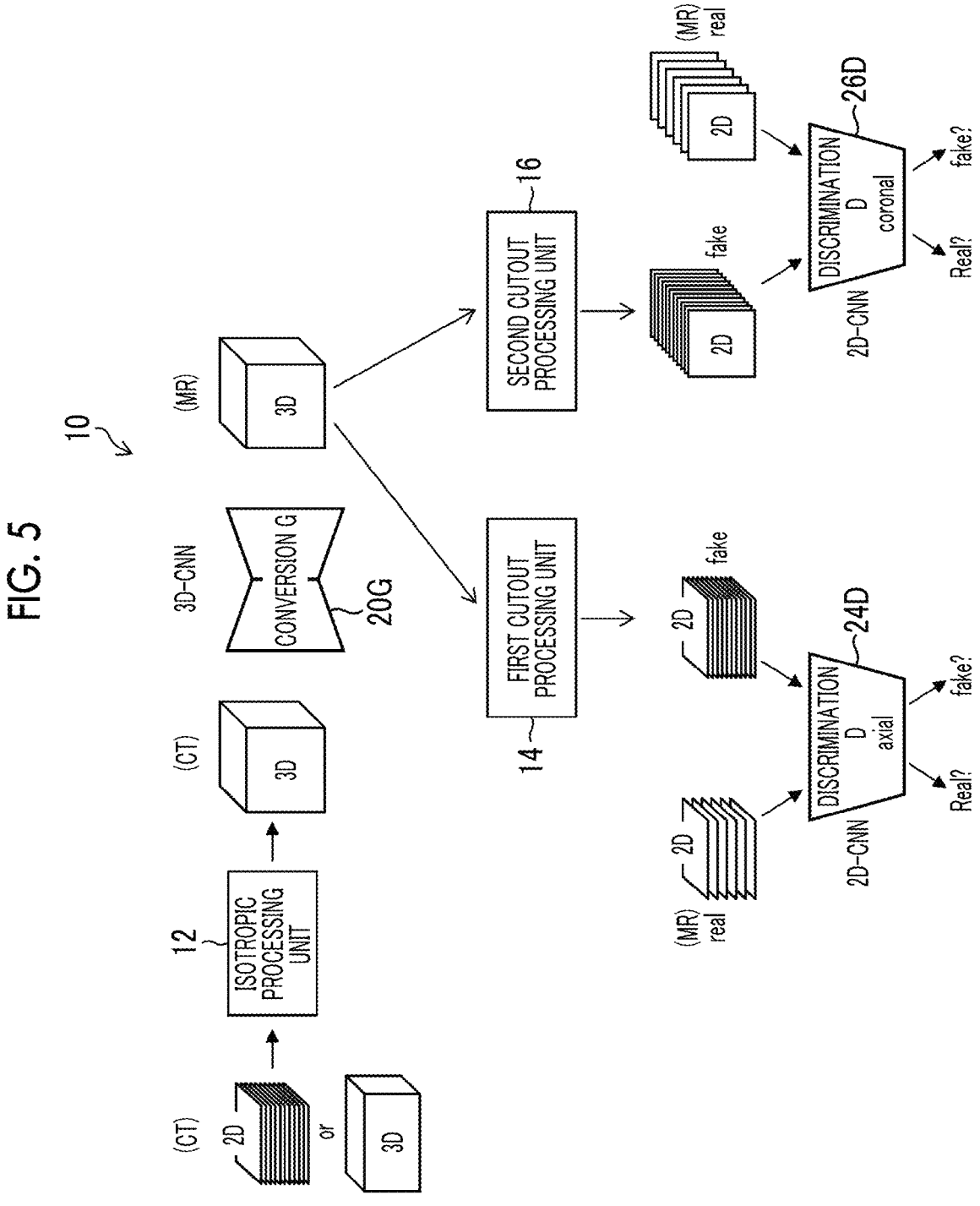
FIG. 5 is a conceptual diagram illustrating an outline of processing in a machine learning system according to a first embodiment.

FIG. 5 is a conceptual diagram illustrating an outline of processing in the machine learning system 10 according to the first embodiment. Here, a method of training an image conversion task of generating a pseudo MR image from a CT image based on the architecture of the GAN with a source domain as CT and a target domain as MR will be described.

A machine learning system 10 according to the first embodiment includes a generator 20G configured using a three-dimensional convolutional neural network (CNN) and at least two discriminators 24D and 26D each configured using a two-dimensional CNN. The generator 20G is a three-dimensional generation network (3D generator) that receives an input of three-dimensional data having a feature of a CT domain and outputs three-dimensional data having a feature of an MR domain. For example, a V-net type architecture obtained by extending U-net in three dimensions is applied to the generator 20G.

The U-net is a neural network that is widely used for medical image segmentation and the like. As a document describing the U-net, for example, there is "Olaf Ronneberger, et al. "U-Net: Convolutional Networks for Biomedical Image Segmentation", MICCAI, 2015". In addition, as a document describing the V-net, for example, there is "Fausto Milletari, et. al. V-Net: Fully Convolutional Neural Networks for Volumetric Medical Image Segmentation".

The plurality of discriminators 24D and 26D are two-dimensional discrimination networks (2D discriminators) that discriminate the authenticity of images corresponding to the input of two-dimensional images in different cross section directions, respectively. For each of the discriminators 24D and 26D, for example, an architecture of the two-dimensional discriminator used in a technology called Pix2Pix is applied. For example, as a document describing the Pix2Pix, there is "Phillip Isola, et. al. "Image-to-Image Translation with Conditional Adversarial Nets"".

In the first embodiment, since the generated image by the generator 20G is three-dimensional, the inputs to the discriminators 24D and 26D are handled as two-dimensional images divided in a specific slice thickness direction. Then, an average value of the outputs of the authenticity discrimination results obtained for these divided slice images (two-dimensional images) is used as a final output of the discriminators 24D and 26D.

In the first embodiment, an image pair of three-dimensional data of CT (actual CT image) actually obtained by imaging using the CT apparatus and three-dimensional data of MR (actual MR image) actually obtained by imaging using the MRI apparatus is used as the training data.

It is desirable that the heterogeneous modality images given as inputs have the same imaging target portion. In addition, the output (generated image) after the conversion by the generator 20G is an image of the same portion as the input image. In the first embodiment, it is assumed that the three-dimensional data of CT and the three-dimensional data of MR, which are in a pair relationship used for training, are obtained by imaging the same imaging range or substantially the same imaging range within an allowable range that can be regarded as substantially the same imaging range for the same patient. In the case of the first embodiment, it is assumed that the MR three-dimensional data used for training is data of a thick slice in which the resolution of the axial cross section is high (the resolution of the sagittal cross section and the coronal cross section are low) and data of a thick slice in which the resolution of the coronal cross section is high (the resolution of the axial cross section and the sagittal cross section are low) (refer to FIG. 3).

In this case, one discriminator 24D is a 2D axial discriminator for discriminating the authenticity of the input of the two-dimensional image of the axial cross section, and the other discriminator 26D is a 2D coronal discriminator for discriminating the authenticity of the input of the two-dimensional image of the coronal cross section.

In addition, in the first embodiment, the three-dimensional data of CT used for training may be data of a thin slice (refer to FIG. 4) in which the resolution of each of the three types of cross sections is high, or may be, as with MR, data of a thick slice in which the resolution of any one cross section of the three types of cross sections is low.

The generator 20G is configured to receive an input of a three-dimensional CT image having an isotropic resolution and output a three-dimensional MR generated image having an isotropic resolution. The machine learning system 10 includes an isotropic processing unit 12 that performs isotropic processing on three-dimensional data in the preceding stage of the generator 20G. The isotropic processing is processing of converting the size of pixels in each axis direction of the x-axis direction, the y-axis direction, and the z-axis direction into equal intervals, and is processing of converting a unit length in each axis direction of (x, y, z) in the three-dimensional data into a physical size at equal intervals. That is, the isotropic processing corresponds to processing of converting a voxel in the three-dimensional data into a cube having a predetermined size. The isotropic resolution means that the shape of the voxel is a cube, that is, the resolution in the axis directions of all of the x axis, the y axis, and the z axis of the three-dimensional image is equal.

For example, the isotropic processing unit 12 interpolates data with a physical size of 1 $mm^3$ for a regular lattice unit of a three-dimensional space by using nearest neighbor interpolation, linear interpolation, spline interpolation, or the like. The physical size of the regular lattice unit is not limited to 1 $mm^3$, and may be a size in which the sufficient resolution required for radiological interpretation is obtained.

The three-dimensional data of CT may be subjected to the isotropic processing using a known technology before being input to the generator 20G, or three-dimensional CNN of the generator 20G may be designed such that the isotropic processing is omitted and the pseudo MR image output from the generator 20G is isotropic.

In addition, for example, instead of the generator 20G that inputs and outputs the three-dimensional image having an isotropic resolution, a generator may be designed that receives an input of a three-dimensional CT image in which the unit lattice of (x, y, and z) is anisotropic and that outputs an anisotropic three-dimensional pseudo MR image with the same lattice size (the pixel intervals of x, y, and z are maintained respectively).

The machine learning system 10 further includes a first cutout processing unit 14 and a second cutout processing unit 16 that cut out two-dimensional images in at least two slice plane (cross section) directions from the three-dimensional data generated by the generator 20G. The cutout processing performed by the first cutout processing unit 14 and the second cutout processing unit 16 is processing of extracting a slice (two-dimensional image) in a specific direction from the three-dimensional data. The specific direction in which the cutout processing is performed corresponds to a direction of the cross section of the two-dimensional image indicating the cross section image input to each of the discriminators 24D and 26D.

In the first embodiment, the first cutout processing unit 14 that cuts out a slice of the axial cross section and the second cutout processing unit 16 that cuts out a slice of the coronal cross section are comprised corresponding to each of the discriminator 24D that receives an input of the two-dimensional image of the axial cross section and the discriminator 26D that receives an input of the two-dimensional image of the coronal cross section.

Each of the first cutout processing unit 14 and the second cutout processing unit 16 may perform processing of extracting all slices in the specific direction from the three-dimensional pseudo MR image output from the generator 20G. For example, in a case where an image size of the pseudo MR image is 64×64×64, the first cutout processing unit 14 may be configured to perform processing of extracting 64 two-dimensional images in which an image size of an xy plane is 64×64, and the second cutout processing unit 16 may be configured to perform processing of extracting 64 two-dimensional images in which an image size of a zx plane is 64×64.

A two-dimensional image cut out by the first cutout processing unit 14 or a two-dimensional image extracted from the three-dimensional data in which the axial cross section is a high resolution among the actual MR images included in the training data is input to the discriminator 24D, and the authenticity discrimination of whether the image is a real image or a fake image generated by the generator 20G is performed in the discriminator 24D.

Similarly, the two-dimensional image extracted by the second cutout processing unit 16 or the two-dimensional image extracted from the three-dimensional data of MR of which the coronal cross section has a high resolution among the training data is input to the discriminator 26D, and the authenticity discrimination of whether the image is a real image or a fake image is performed in the discriminator 26D.

The "real image" means an actual image obtained by actually performing imaging using an imaging apparatus. The "fake image" means a generated image (pseudo image) artificially generated by image conversion processing without performing imaging. In the case of the first embodiment, the data used as the training data input to the learning model 44 is the "real image", and the generated image generated by the generator 20G is the "fake image".

Since the actual MR image prepared as the training data has a high resolution only in any one direction of the three types of cross section directions, the two-dimensional discriminators 24D and 26D corresponding to the high resolution slice plane direction are selectively switched according to the input data such that the authenticity discrimination is performed using the two-dimensional image of the high resolution cross section.

As described above, in the machine learning system 10, the discriminators 24D and 26D used for the image evaluation of the authenticity discrimination are used according to the condition of the resolution of the input image, and the evaluation of whether the image is a real image or a fake image is performed using only the two-dimensional image of the cross section having a high resolution.

The generator 20G is an example of a "first generator" according to the embodiment of the present disclosure. The discriminator 24D is an example of a "first discriminator" according to the embodiment of the present disclosure, and the discriminator 26D is an example of a "second discriminator" according to the embodiment of the present disclosure. The domain of CT is an example of a "first domain" according to the embodiment of the present disclosure, and the domain of MR is an example of a "second domain" according to the embodiment of the present disclosure.

An example of a "first imaging condition" according to the embodiment of the present disclosure is that the imaging apparatus used for imaging is the CT apparatus. An example of a "second imaging condition" according to the embodiment of the present disclosure is that the imaging apparatus used for imaging is the MRI apparatus. The CT apparatus is an example of a "first imaging apparatus" and a "first modality" according to the embodiment of the present disclosure, and the CT image is an example of a "first modality image" according to the embodiment of the present disclosure. The MRI apparatus is an example of a "second imaging apparatus" and a "second modality" according to the embodiment of the present disclosure, and the MR image is an example of a "second modality image" according to the embodiment of the present disclosure. The thin slice is an example of a "first resolution condition" according to the embodiment of the present disclosure. The thick slice is an example of a "second resolution condition" according to the embodiment of the present disclosure.

The slice plane direction in which the axial cross section is obtained is an example of a "first slice plane direction" according to the embodiment of the present disclosure, and the slice plane direction in which the coronal cross section is obtained is an example of a "second slice plane direction" according to the embodiment of the present disclosure. The cutout processing performed by the first cutout processing unit 14 is an example of a "first cutout processing" according to the embodiment of the present disclosure, and the cutout processing performed by the second cutout processing unit 16 is an example of a "second cutout processing" according to the embodiment of the present disclosure. The isotropic processing performed by the isotropic processing unit 12 is an example of "first isotropic processing" according to the embodiment of the present disclosure.

Configuration Example of Machine Learning System 10

Figure 6:
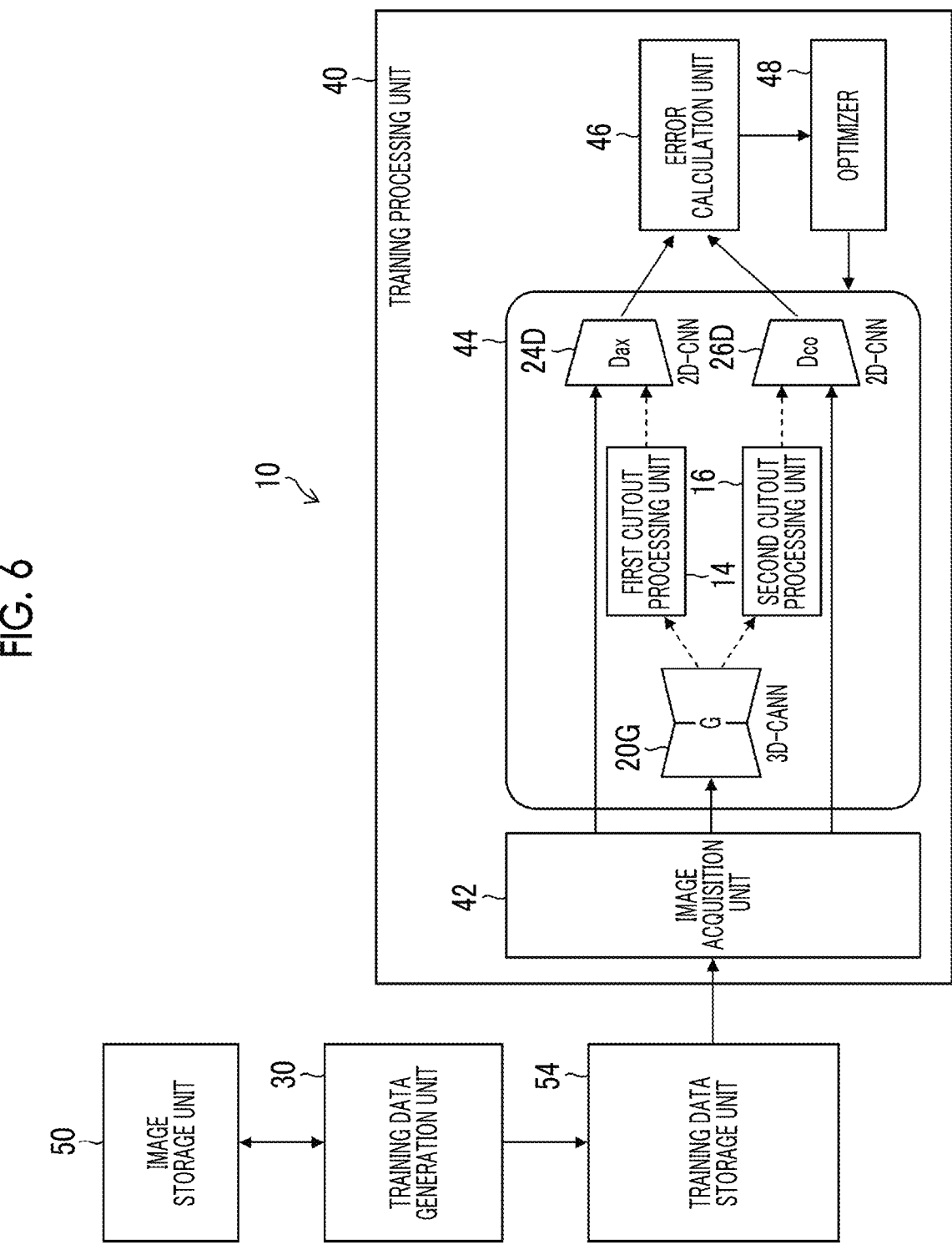
FIG. 6 is a functional block diagram illustrating a configuration example of the machine learning system according to the first embodiment.

FIG. 6 is a functional block diagram illustrating a configuration example of the machine learning system 10 according to the first embodiment. The machine learning system 10 includes a training data generation unit 30 and a training processing unit 40. The machine learning system 10 may further include an image storage unit 50 and a training data storage unit 54.

The machine learning system 10 can be implemented by a computer system including one or a plurality of the computers. Each function of the training data generation unit 30, the training processing unit 40, the image storage unit 50, and the training data storage unit 54 can be implemented by a combination of hardware and software of the computer. Functions of these units may be implemented by one computer, or may be implemented by two or more computers by sharing the processing functions.

Here, an example in which the training data generation unit 30, the training processing unit 40, the image storage unit 50, and the training data storage unit 54 are configured as separate devices will be described. For example, the training data generation unit 30, the training processing unit 40, the image storage unit 50, and the training data storage unit 54 may be connected to each other via an electric communication line. The term "connection" is not limited to a wired connection, and also includes a concept of wireless connection. The electric communication line may be a local area network or may be a wide area network. With this configuration, generation processing of the training data and the training processing of the generation model can be performed without being physically and temporally bound to each other.

The image storage unit 50 includes a large-capacity storage device that stores CT reconstructed images (CT images) captured by a medical X-ray CT apparatus and MR reconstructed images (MR images) captured by the MRI apparatus. The image storage unit 50 may be, for example, a digital imaging and communications in medicine (DI- COM) server that stores medical images conforming to the DICOM standard. The medical image stored in the image storage unit 50 may be an image for each portion of a human body or may be an image obtained by imaging the whole body.

The training data generation unit 30 generates data for training (training data) used for machine learning. The training data is synonymous with "learning data". In the machine learning system 10 according to the first embodiment, a plurality of image pairs in which three-dimensional data which is an actual CT image actually captured using the CT apparatus and three-dimensional data which is an actual MR image actually captured using the MRI apparatus are associated with each other are used as the training data. Such training data can be generated from data stored in the image storage unit 50.

The training data generation unit 30 acquires original three-dimensional data from the image storage unit 50, performs preprocessing such as isotropization, posture conversion, and cutting out of a fixed size region, and generates three-dimensional data having a desired number of pixels (the number of voxels) and a desired image size suitable for input to the training processing unit 40. In order to efficiently perform the training processing by the training processing unit 40, a plurality of pieces of training data may be generated in advance using the training data generation unit 30 and stored in a storage as the training dataset.

The training data storage unit 54 includes a storage that stores the pre-processed training data generated by the training data generation unit 30. The training data generated by the training data generation unit 30 is read out from the training data storage unit 54 and is input to the training processing unit 40.

The training data storage unit 54 may be included in the training data generation unit 30, or a part of the storage region of the image storage unit 50 may be used as the training data storage unit 54. In addition, a part or all of the processing functions of the training data generation unit 30 may be included in the training processing unit 40.

The training processing unit 40 includes an image acquisition unit 42 and a learning model 44 having a structure of GAN. The image acquisition unit 42 acquires training data to be input to the learning model 44 from the training data storage unit 54. The training data acquired via the image acquisition unit 42 is input to the learning model 44. The learning model 44 includes the generator 20G, the first cutout processing unit 14, the second cutout processing unit 16, and the discriminators 24D and 26D.

The training processing unit 40 further includes an error calculation unit 46 and an optimizer 48. The error calculation unit 46 evaluates an error between outputs from the discriminators 24D and 26D and a correct answer using a loss function. Further, the error calculation unit 46 evaluates an error between two-dimensional image of the pseudo MR (fake MR) extracted by the first cutout processing unit 14 and two-dimensional image of the correct answer (real MR) corresponding thereto. The error may be rephrased as a loss.

The optimizer 48 performs processing of updating parameters of the network in the learning model 44 based on a calculation result of the error calculation unit 46. The parameters of the network include a filter coefficient (weight of connection between nodes) of filters used for processing each layer of the CNN, a bias of a node, and the like.

That is, the optimizer 48 performs parameter calculation processing of calculating the update amount of the parameter of each network of the generator 20G and the discriminators 24D and 26D from the calculation result of the error calculation unit 46 and parameter update processing of updating the parameter of each network of the generator 20G and the discriminators 24D and 26D according to the calculation result of the parameter calculation processing. The optimizer 48 performs updating of the parameters based on an algorithm such as a gradient descent method.

The training processing unit 40 trains the learning model 44 while improving the performance of each model by repeating the adversarial training using the generator 20G and the discriminators 24D and 26D based on the input training data.

About Generation of Training Data

Figure 7:
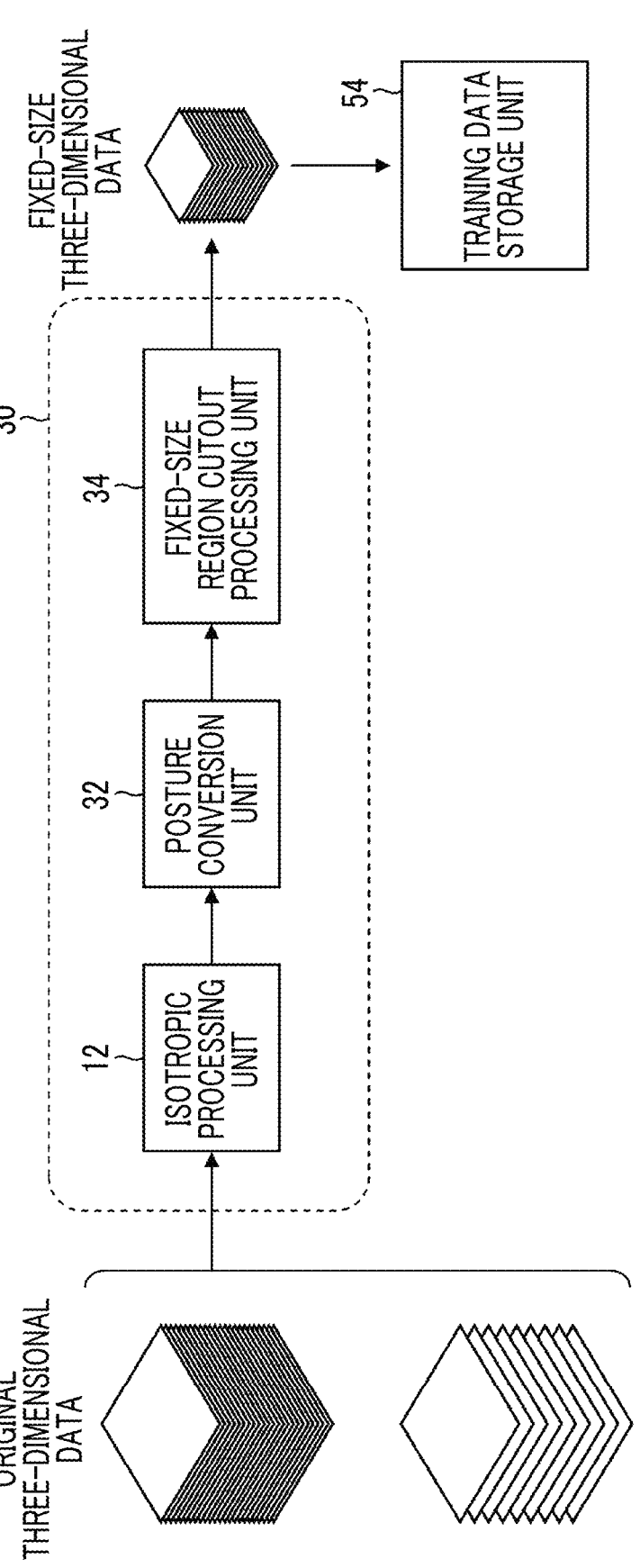
FIG. 7 is a functional block diagram illustrating a configuration example of a training data generation unit.

FIG. 7 is a functional block diagram illustrating a configuration example of the training data generation unit 30. The training data generation unit 30 includes the isotropic processing unit 12, a posture conversion unit 32, and a fixed-size region cutout processing unit 34. For example, the training data generation unit 30 performs posture conversion on the three-dimensional data in which the sizes of the pixel unit in each direction of the x axis, the y axis, and the z axis are isotropically scaled to 1 mm by the isotropic processing unit 12 using the posture conversion unit 32, and then, the training data generation unit 30 performs processing of cutting out fixed-size regions randomly using the fixed-size region cutout processing unit 34. The fixed-size region may be a three-dimensional region having a cubic shape in which the number of pixels in x-axis direction×y-axis direction× z-axis direction is, for example, "160×160×160".

The original three-dimensional data input to the training data generation unit 30 may be the CT image or may be the MR image. The fixed-size three-dimensional data which is cut out to the fixed-size region by the fixed-size region cutout processing unit 34 is stored in the training data storage unit 54. The fixed-size three-dimensional data cut out to the fixed-size region may be understood as the training data, or the original three-dimensional data before being cut out to the fixed-size region may be understood as the training data.

Figure 8:
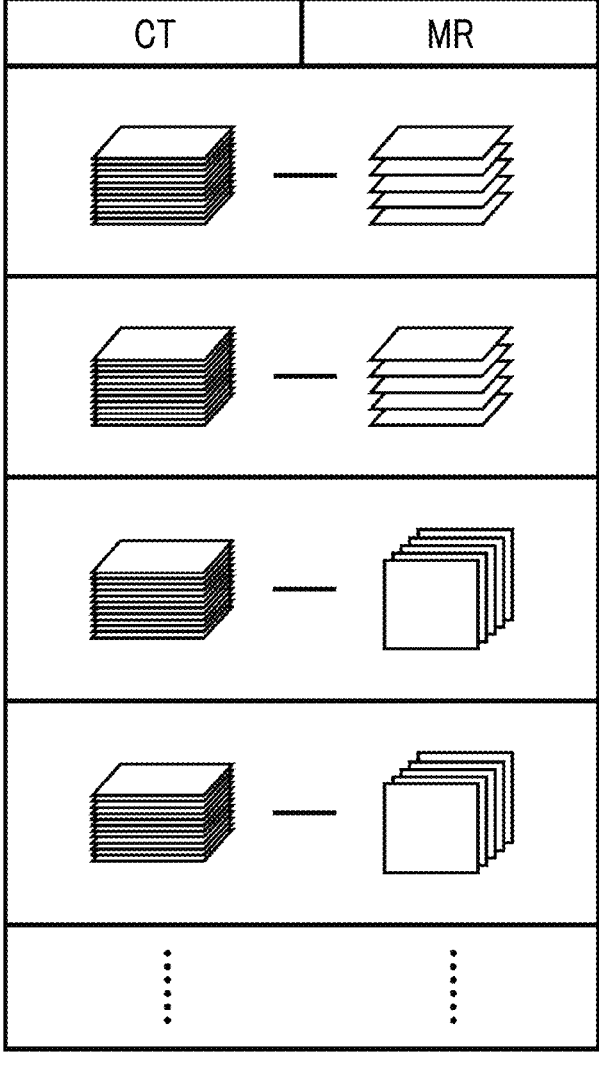
FIG. 8 is a conceptual diagram of a training dataset used in the first embodiment.

FIG. 8 is a conceptual diagram of a training dataset used in the first embodiment. In the first embodiment, a plurality of pairs of three-dimensional data of the thin slice of CT and corresponding three-dimensional data of the thick slice of MR are prepared, and these image pairs are used as the training data.

Training Method According to First Embodiment

In the machine learning system 10 according to the first embodiment, the discriminators 24D and 26D used for the authenticity discrimination are switched according to the input three-dimensional data. That is, in a case where an image pair of an MR image of which the axial cross section has a high resolution and a CT image corresponding to the MR image is input, the discrimination of the generated image after conversion by the generator 20G is performed by the discriminator 24D that evaluates the two-dimensional image of the axial cross section.

On the other hand, in a case where the image pair of the MR image of which the coronal cross section has a high resolution and the CT image corresponding to the MR image is input, the discrimination of the generated image after conversion by the generator 20G is performed by the discriminator 26D that evaluates the two-dimensional image of the coronal cross section.

As described above, in the adversarial training, the generator 20G obtains a performance for generating high resolution three-dimensional images in each axis direction of the x axis, the y axis, and the z axis by evaluating the generated image using only the high resolution two-dimensional images of cross sections. By performing training using the machine learning system 10 according to the first embodiment, it is possible to obtain a three-dimensional generator 20G in which images of which each cross section of the axial cross section, the coronal cross section, and the sagittal cross section has a high resolution can be obtained.

The method of generating the trained generator 20G by the training processing using the machine learning system 10 is an example of a "method of generating a trained model" according to the embodiment of the present disclosure. The CT image of the thin slice used for training is an example of a "three-dimensional image captured under a first imaging condition" according to the embodiment of the present disclosure, and the MR image of the thick slice is an example of a "three-dimensional image captured under a second imaging condition" according to the embodiment of the present disclosure. The three-dimensional data of the thick slice is an example of "isotropic three-dimensional data" according to the embodiment of the present disclosure, and the three-dimensional data of the thick slice is an example of "anisotropic three-dimensional data" according to the embodiment of the present disclosure. The three-dimensional data of the thick slice of which the axial cross section has a high resolution is anisotropic three-dimensional data in which the resolution in the z-axis direction is lower than the resolution in each of the other two axis directions (the x-axis direction and the y-axis direction), and is an example of "z-axis low resolution anisotropic three-dimensional data" according to the embodiment of the present disclosure. The direction of the axial cross section in the three-dimensional data in which the axial cross section is a high resolution is a slice plane direction parallel to the x-axis direction and the y-axis direction in which the resolution is relatively high. The three-dimensional data of the thick slice of which the coronal cross section has a high resolution is an example of "y-axis low resolution anisotropic three-dimensional data" according to the embodiment of the present disclosure. The pseudo MR image output from the generator 20G is an example of a "second modality generated image" according to the embodiment of the present disclosure.

Modification Example 1

Figure 9:
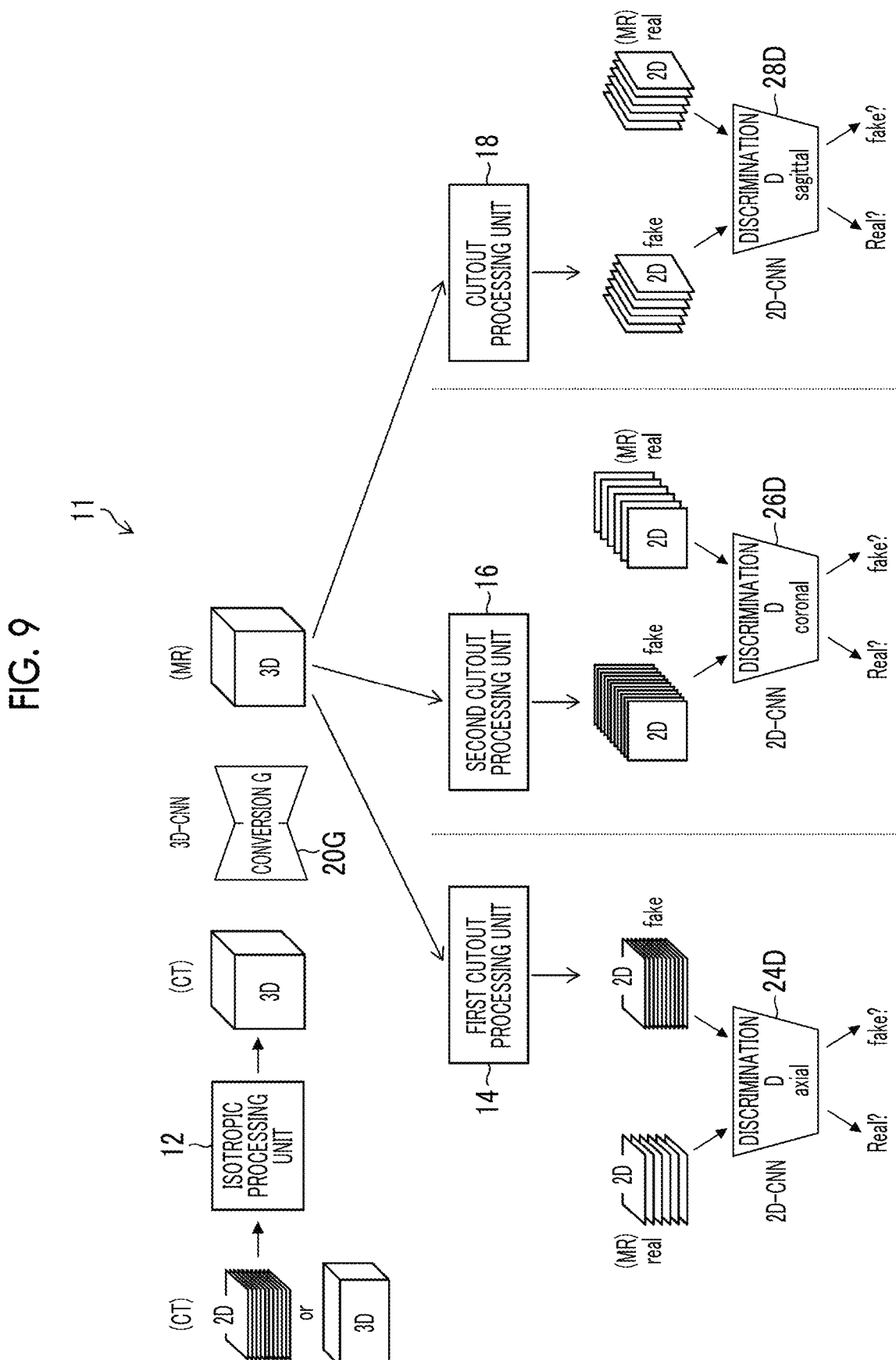
FIG. 9 is a conceptual diagram illustrating Modification Example 1 of the first embodiment.

FIG. 9 is a conceptual diagram illustrating Modification Example 1 of the first embodiment. In FIG. 9, the same elements as those in FIG. 5 are denoted by the same reference numerals, and the description thereof will not be repeated. Regarding the configuration illustrated in FIG. 9, points different from FIG. 5 will be described.

In the first embodiment illustrated in FIG. 5, an example in which two types of two-dimensional discriminators of the discriminator 24D for evaluating the two-dimensional image of the axial cross section and the discriminator 26D for evaluating the two-dimensional image of the coronal cross section are used has been described, but a machine learning system 11 according to Modification Example 1 illustrated in FIG. 9 comprises a cutout processing unit 18 that performs cutout processing of extracting a two-dimensional image in a sagittal cross section direction from the generated image of the generator 20G and a discriminator 28D for evaluating the two-dimensional image of the sagittal cross section in addition to the configuration of FIG. 5. The discriminator 28D, like the other discriminators 24D and 26D, is configured using the two-dimensional CNN.

In the case of Modification Example 1, a pair of an MR image of the thick slice of which the sagittal cross section has a high resolution and a CT image corresponding to the MR image can be used as the training data.

In the machine learning system 11 according to Modification Example 1, in a case where the pair image of the MR image of which the sagittal cross section has a high resolution and the CT image corresponding to the MR image is input, discrimination of a generated image after conversion by the generator 20G is performed by the discriminator 28D that evaluates the two-dimensional image of the sagittal cross section.

By performing training using the machine learning system 11 according to Modification Example 1, it is possible to obtain the generator 20G that performs three-dimensional image conversion (domain conversion) in which generated images of which each cross section of the axial cross section, the coronal cross section, and the sagittal cross section has a high resolution can be obtained.

Modification Example 2

In the first embodiment, an example using the z-axis low resolution anisotropic three-dimensional data and the y-axis low resolution anisotropic three-dimensional data as the training data has been described, but a combination of two types of low resolution data is not limited to this example.

In a case where three types of low resolution data of low resolution three-dimensional data in the z-axis direction, low resolution three-dimensional data in the y-axis direction, and low resolution three-dimensional data in the x-axis direction are assumed, there are three combinations of two types of low resolution data in total.

[Combination 1] A combination of the low resolution three-dimensional data in the z-axis direction and the low resolution three-dimensional data in the y-axis direction

[Combination 2] A combination of the low resolution three-dimensional data in the y-axis direction and the low resolution three-dimensional data in the x-axis direction

[Combination 3] A combination of the low resolution three-dimensional data in the x-axis direction and the low resolution three-dimensional data in the z-axis direction The example described in the first embodiment is a case of [Combination 1]. In a case of using the training data in [Combination 2], as the discriminator, a 2D coronal discriminator that receives an input of a two-dimensional image of the coronal cross section and discriminates authenticity and a 2D sagittal discriminator that receives an input of a two-dimensional image of the sagittal cross section and discriminates authenticity are used, and cutout processing of a cross section image in the slice plane direction corresponding to each discriminator from the three-dimensional generated image is performed at the time of input to each discriminator.

The three-dimensional data of the thick slice of which the sagittal cross section has high resolution is an example of the low resolution three-dimensional data in the x-axis direction, and is an example of "x-axis low resolution anisotropic three-dimensional data" according to the embodiment of the present disclosure.

Similarly, in a case of using the training data in [Combination 3], as the discriminator, the 2D sagittal discriminator and the 2D axial discriminator are used, and processing of cutting out a corresponding cross section image in the slice plane direction corresponding to each discriminator from the three-dimensional generated image is performed at the time of input to each discriminator.

About MRI-to-CT Conversion

In the first embodiment, an example of CT-to-MR conversion for generating the pseudo MR image from the actual CT image has been described, but it is also possible to train a generator that performs MRI-to-CT conversion for generating the pseudo CT image from the MR image by using the same dataset (a dataset including data of the thick slice) as the training data used for training in the first embodiment.

In this case, the same architecture as that of the learning model according to the first embodiment may be applied. However, in a case where the three-dimensional data in which all of the three types of cross sections have high resolutions is present, as the CT image of the thin slice, a three-dimensional discriminator (3D discriminator) may be applied as a discriminator for evaluating a generated pseudo CT image.

Figure 10:
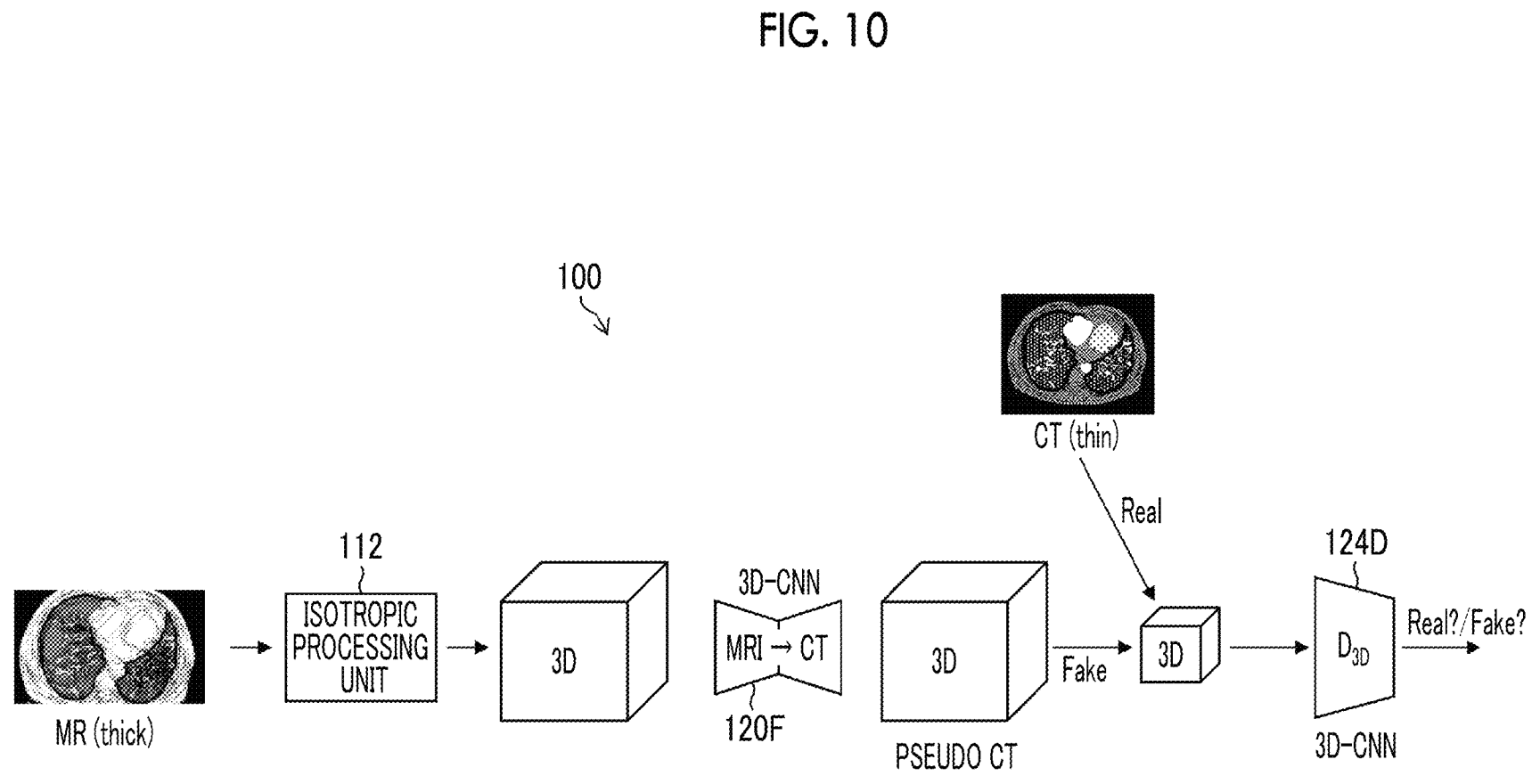

FIG. 10 is a conceptual diagram illustrating an outline of processing in a machine learning system 100 that trains a task of MR-to-CT domain conversion. The machine learning system 100 includes a generator 120F configured using a three-dimensional CNN and a discriminator 124D configured using a three-dimensional CNN. The machine learning system 100 may include an isotropic processing unit 112 that performs isotropic processing on the three-dimensional data before the input of the generator 120F, a posture conversion unit (not illustrated), and a fixed-size region cutout processing unit (not illustrated).

The discriminator 124D receives an input of the three-dimensional data generated by the generator 120F or the three-dimensional data which is the actual CT image included in the training data and performs discrimination of whether the input three-dimensional data is a real image or a fake image.

Since the actual CT image of the thin slice used as the training data has a high resolution in each direction of three axes, it is possible to train using the three-dimensional discriminator 124D as illustrated in FIG. 10.

Second Embodiment

In a case of medical images, it is often difficult to prepare corresponding pair images between heterogeneous modalities. In the second embodiment, an example in which an architecture based on the mechanism of CycleGAN described in Zizhao Zhang, Lin Yang, Yefeng Zheng "Translating and Segmenting Multimodal Medical Volumes with Cycle- and Shape-Consistency Generative Adversarial Network", ArXiv: 1802.09655 is adopted, and an image group of each domain having no correspondence relationship (not paired) is used as the training data to train a task of domain conversion.

Figure 11:
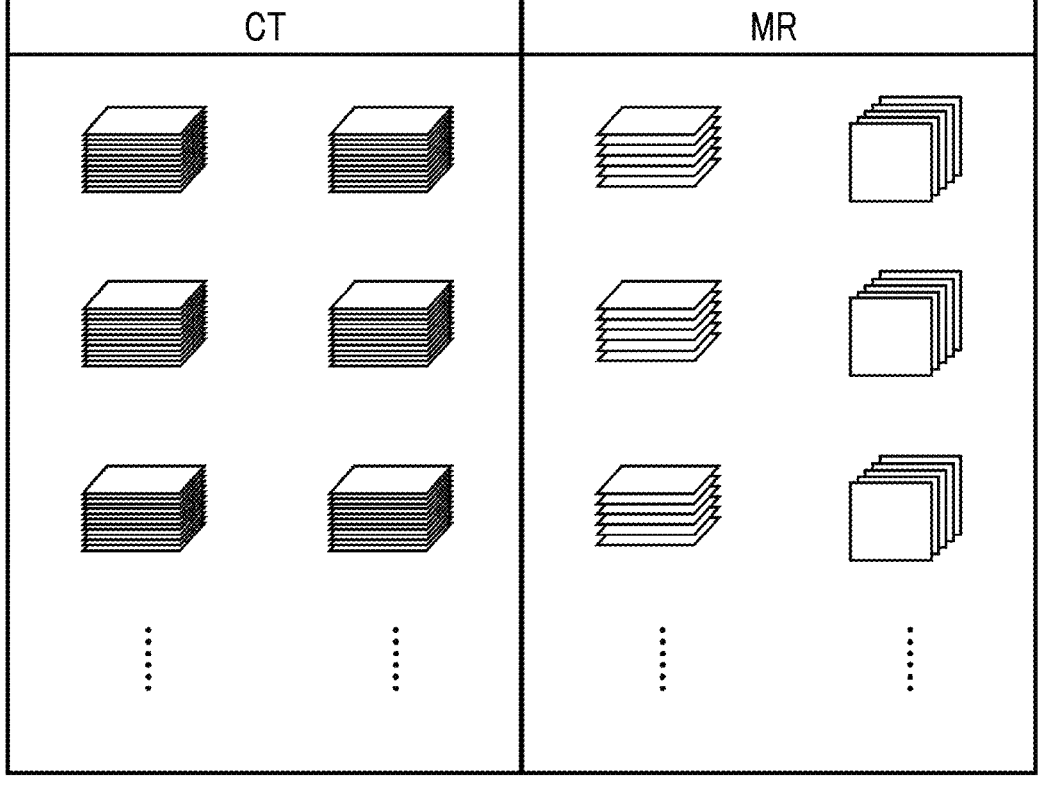
FIG. 11 is a conceptual diagram of a training dataset used in a second embodiment.

FIG. 11 is a conceptual diagram of a training dataset used in the second embodiment. In the case of the second embodiment, the image group of the actual CT image and the image group of the actual MR image may be present. In the second embodiment, the three-dimensional data of a plurality of actual images in each domain of CT and MRI is used as data used for training. The three-dimensional data of each domain may be the same as those described in FIGS. 3 and 4.

The training dataset used in the second embodiment includes a plurality of pieces of three-dimensional data of thin slices and a plurality of pieces of three-dimensional data of thick slices captured using the MRI apparatus. The training dataset may include three-dimensional data of the thick slice captured using the CT apparatus.

Figure 12:
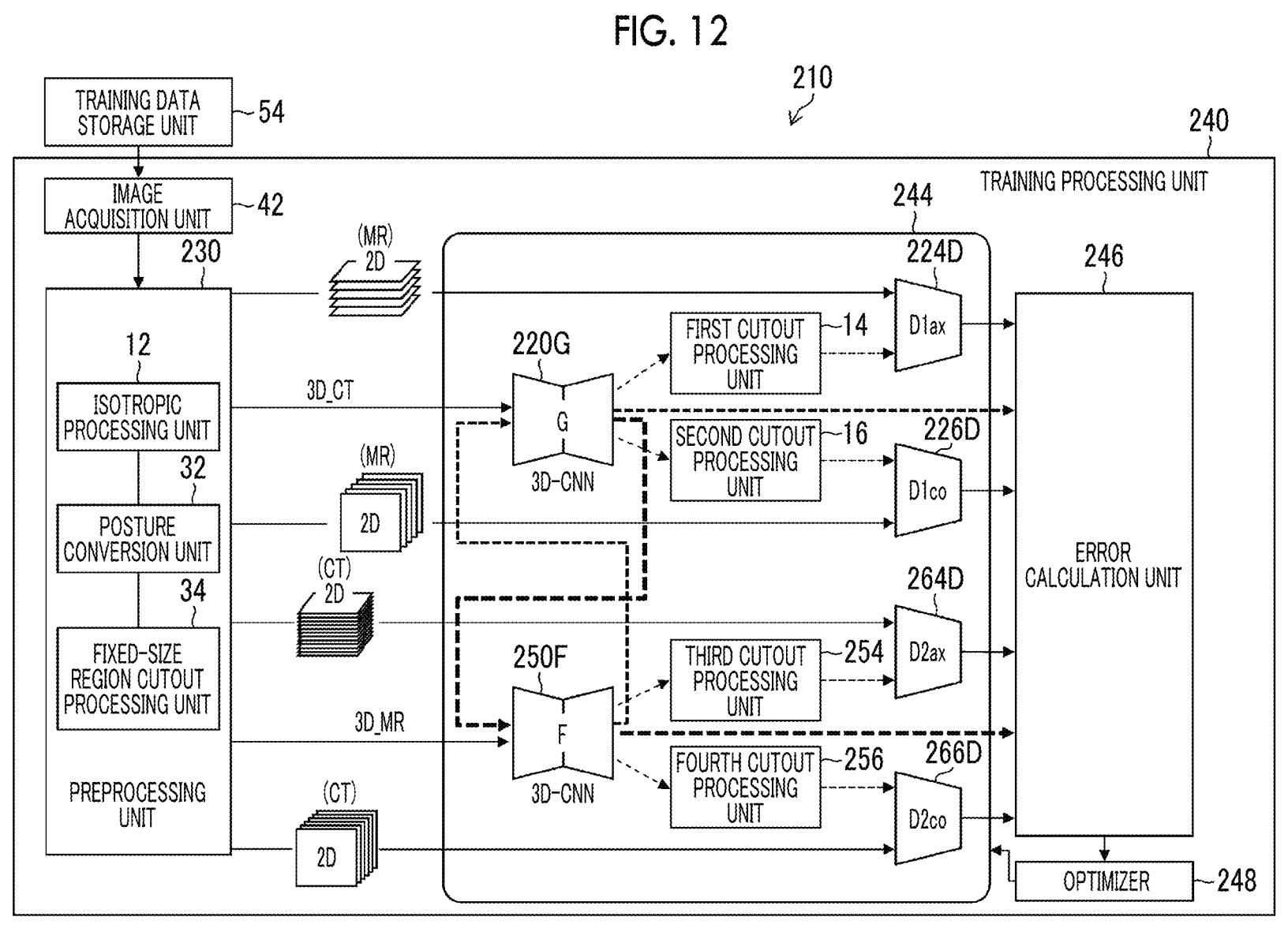

FIG. 12 is a functional block diagram illustrating a configuration example of a machine learning system 210 according to the second embodiment. In FIG. 12, elements that are the same as or similar to those in the configuration illustrated in FIG. 6 are denoted by the same reference numerals, and redundant descriptions thereof will be omitted.

The training data storage unit 54 illustrated in FIG. 12 stores the training dataset in which the three-dimensional data of the thin slice and the three-dimensional data of the thick slice as described in FIG. 11 are mixed.

The machine learning system 210 includes a training processing unit 240 instead of the training processing unit 40 in FIG. 6. The training processing unit 240 includes an image acquisition unit 42, a preprocessing unit 230, a learning model 244, an error calculation unit 246, and an optimizer 248.

The preprocessing unit 230 performs the same processing as the training data generation unit 30 described with reference to FIG. 7, and includes the isotropic processing unit 12, the posture conversion unit 32, and the fixed-size region cutout processing unit 34. The preprocessing unit 230 performs preprocessing for input to the learning model 244 on the three-dimensional data acquired via the image acquisition unit 42. Here, the isotropic processing, the posture conversion, and the extraction processing of the fixed-size region are exemplified as the preprocessing, but these processing may be performed as necessary, and a part or all of the processing in the preprocessing unit 230 may be omitted. In addition, the preprocessing unit 230 may be configured separately with a preprocessing unit for CT that performs preprocessing of a CT image and a preprocessing unit for MR that performs preprocessing of an MR image.

The learning model 244 includes a first generator 220G, the first cutout processing unit 14, the second cutout processing unit 16, a first discriminator 224D, a second discriminator 226D, a second generator 250F, a third cutout processing unit 254, a fourth cutout processing unit 256, a third discriminator 264D, and a fourth discriminator 266D.

Each of the first generator 220G and the second generator 250F is configured using the three-dimensional CNN. The network structure of each of the first generator 220G and the second generator 250F may be the same as that of the generator 20G described in the first embodiment.

Each of the first discriminator 224D, the second discriminator 226D, the third discriminator 264D, and the fourth discriminator 266D is configured using the two-dimensional CNN. The network structure of these discriminators may be similar to the discriminators 24D and 26D described in the first embodiment.

The first generator 220G is a 3D generator that performs CT-to-MRI domain conversion, receives an input of three-dimensional data having a feature of a CT domain, and generates and outputs three-dimensional data having a feature of an MR domain. In FIG. 12, the description "3D_CT" input to the first generator 220G represents three-dimensional data of an isotropic actual CT image.

The second generator 250F is a 3D generator that performs MRI-to-CT domain conversion, receives an input of three-dimensional data having an MR domain feature, and generates and outputs three-dimensional data having a feature of CT domain. In FIG. 12, the description "3D_MR" input to the second generator 250F represents three-dimensional data of an isotropic actual MR image.

The output of the first generator 220G is connected to the input of the second generator 250F, and a pseudo MR image generated by the first generator 220G can be input to the second generator 250F.

In addition, the output of the second generator 250F is connected to the input of the first generator 220G, and a pseudo CT image generated by the first generator 220G can be input to the second generator 250F.

The third cutout processing unit 254 performs cutout processing of extracting a slice of the axial cross section from the three-dimensional data of the pseudo CT image output from the second generator 250F. The two-dimensional image extracted by the third cutout processing unit 254 is input to the third discriminator 264D.

A two-dimensional image extracted by the third cutout processing unit 254 or a two-dimensional image of the axial cross section extracted from the actual three-dimensional data of CT (real CT image) included in the training data is input to the third discriminator 264D, and the discrimination of whether the image is a real image or a fake image generated by the second generator 250F is performed in the third discriminator 264D.

The fourth cutout processing unit 256 performs cutout processing of extracting a slice of the coronal cross section from the three-dimensional pseudo CT image output from the second generator 250F. The two-dimensional image extracted by the fourth cutout processing unit 256 is input to the fourth discriminator 266D.

A two-dimensional image extracted by the fourth cutout processing unit 256 or a two-dimensional image of the coronal cross section extracted from the actual three-dimensional data of CT (real CT image) included in the training data is input to the fourth discriminator 266D, and the discrimination of whether the image is a real image or a fake image is performed in the fourth discriminator 266D.

The error calculation unit 46 evaluates an error (adversarial loss) between an output from each discriminator (224D, 226D, 264D, and 266D) and a correct answer using a loss function. Further, the error calculation unit 46 evaluates a reconstruction loss (cycle consistency loss) through image conversion in which the first generator 220G and the second generator 250F are connected.

The reconstruction loss includes an error between the reconstructed generated image output from the second generator 250F by inputting the output of the CT-to-MR conversion by the first generator 220G to the second generator 250F and the original input image input to the first generator 220G (reconstruction loss through CT-to-MR-to-CT conversion), and an error between the reconstructed generated image output from the first generator 220G by inputting the output of the MR-to-CT conversion by the second generator 250F to the second generator 250F and the original input image input to the second generator 250F (reconstruction loss through MR-to-CT-to-MR conversion).

The optimizer 248 performs processing of updating parameters of the network in the learning model 244 based on a calculation result of the error calculation unit 246. The optimizer 248 performs parameter calculation processing of calculating the update amount of the parameter of each network of the first generator 220G, the first discriminator 224D, the second discriminator 226D, the second generator 250F, the third discriminator 264D, and the fourth discriminator 266D from the calculation result of the error calculation unit 46, and parameter update processing of updating the parameter of each network according to the calculation result of the parameter calculation processing.

Outline of Processing at the Time of CT Input
(CT-to-MR)

Figure 13:
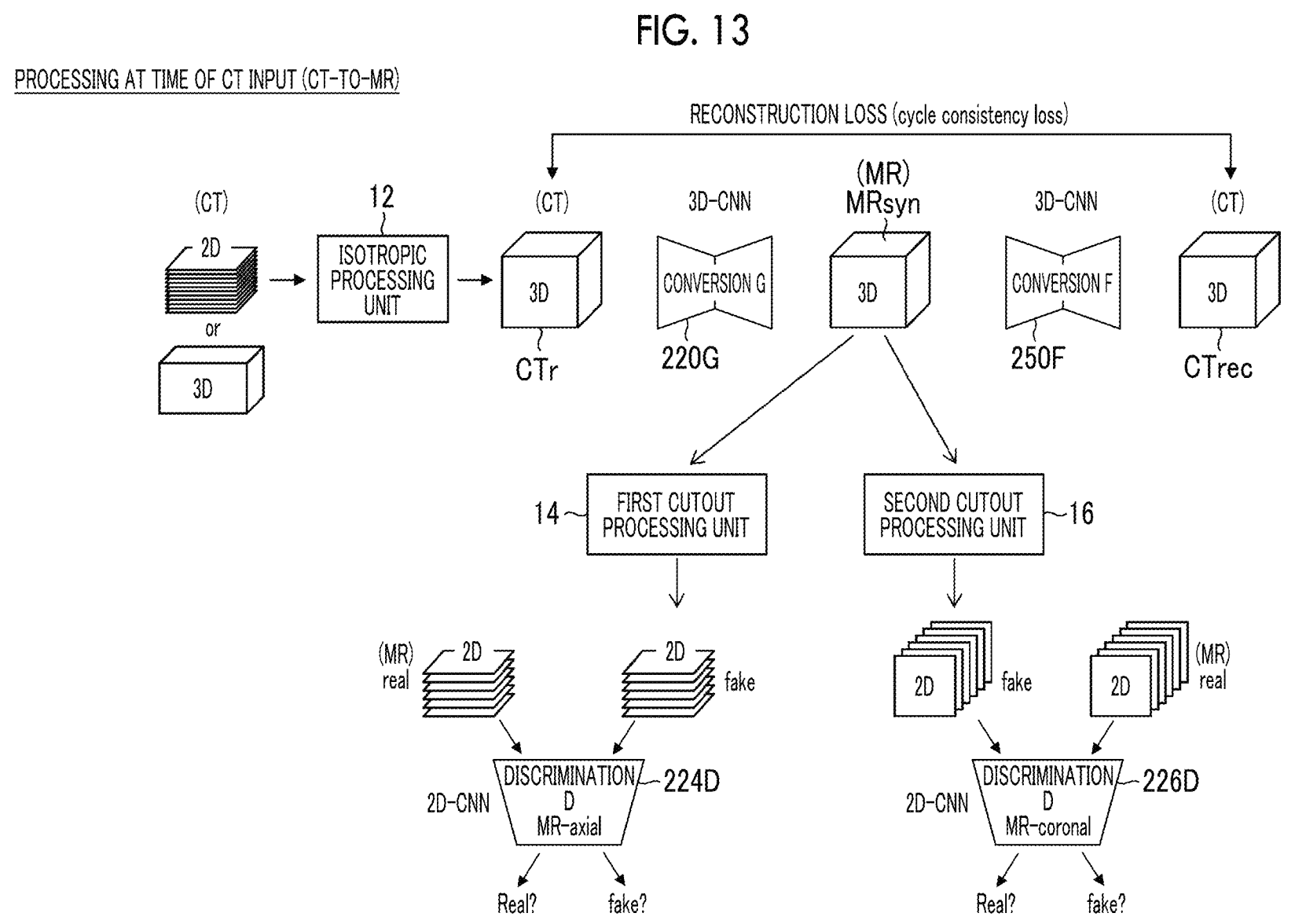

FIG. 13 is a conceptual diagram illustrating a flow of processing at the time of CT input in the machine learning system 210 according to the second embodiment. In the following description, a case where each of the first generator 220G and the second generator 250F receives an input of a three-dimensional image having an isotropic resolution and outputs a three-dimensional generated image having an isotropic resolution will be described, but as described above, a generator that receives an input of a three-dimensional image having an anisotropic resolution may be used.

The three-dimensional data of CT is input to the first generator 220G as a three-dimensional CT image CTr having an isotropic resolution through the isotropic processing by the isotropic processing unit 12. The first generator 220G receives the input of the CT image CTr, performs CT-to-MR conversion, and outputs a pseudo MR image MRsyn.

The pseudo MR image MRsyn is divided into slices (two-dimensional images) in a specific cross section direction by each of the first cutout processing unit 14 and the second cutout processing unit 16, is input to the first discriminator 224D and the second discriminator 226D for each cross section direction, and is subjected to authenticity discrimination by each of the first discriminator 224D and the second discriminator 226D.

In addition, the pseudo MR image MRsyn is further input to the second generator 250F, MR-to-CT conversion is performed by the second generator 250F, and a reconstructed CT image CTrec is output from the second generator 250F.

In the machine learning system 210, a reconstruction loss indicating a difference between the reconstructed CT image CTrec output from the second generator 250F and the original CT image CTr is evaluated. The reconstruction loss is an example of a "first reconstruction loss" according to the embodiment of the present disclosure.

The reconstructed CT image CTrec generated by the conversion processing using the first generator 220G and the second generator 250F in this order is an example of a "first reconstructed generated image" according to the embodiment of the present disclosure.

Outline of Processing at the Time of MR Input
(MR-to-CT)

Figure 14:
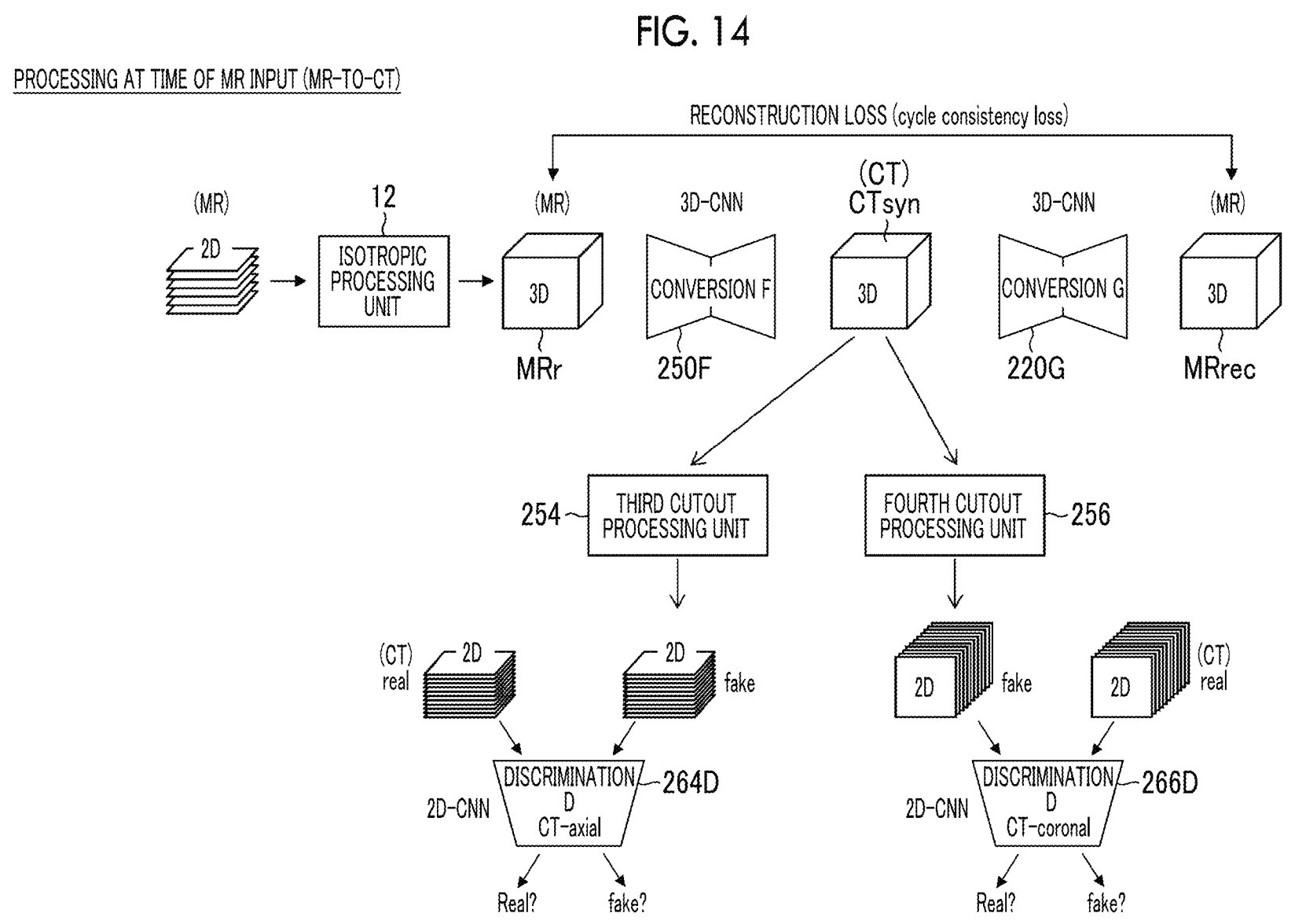

FIG. 14 is a conceptual diagram illustrating a flow of processing at the time of MR input in the machine learning system 210 according to the second embodiment. The three-dimensional data of MR is input to the second generator 250F as the three-dimensional MR image MRr having an isotropic resolution through the isotropic processing by the isotropic processing unit 12. The second generator 250F receives an input of the MR image MRr, performs MR-to-CT conversion, and outputs a pseudo CT image CTsyn. The isotropic processing performed on the three-dimensional data of MR is an example of a "second isotropic processing" according to the embodiment of the present disclosure.

The pseudo CT image CTsyn is divided into slices (two-dimensional images) in a specific cross section direction by each of the third cutout processing unit 254 and the fourth cutout processing unit 256, is input to the third discriminator 264D and the fourth discriminator 266D for each cross section direction, and is subjected to authenticity discrimination by each of the third discriminator 264D and the fourth discriminator 266D.

In addition, the pseudo CT image CTsyn is further input to the first generator 220G, CT-to-MR conversion is performed by the first generator 220G, and a reconstructed MR image MRrec is output from the first generator 220G.

Figure 15:
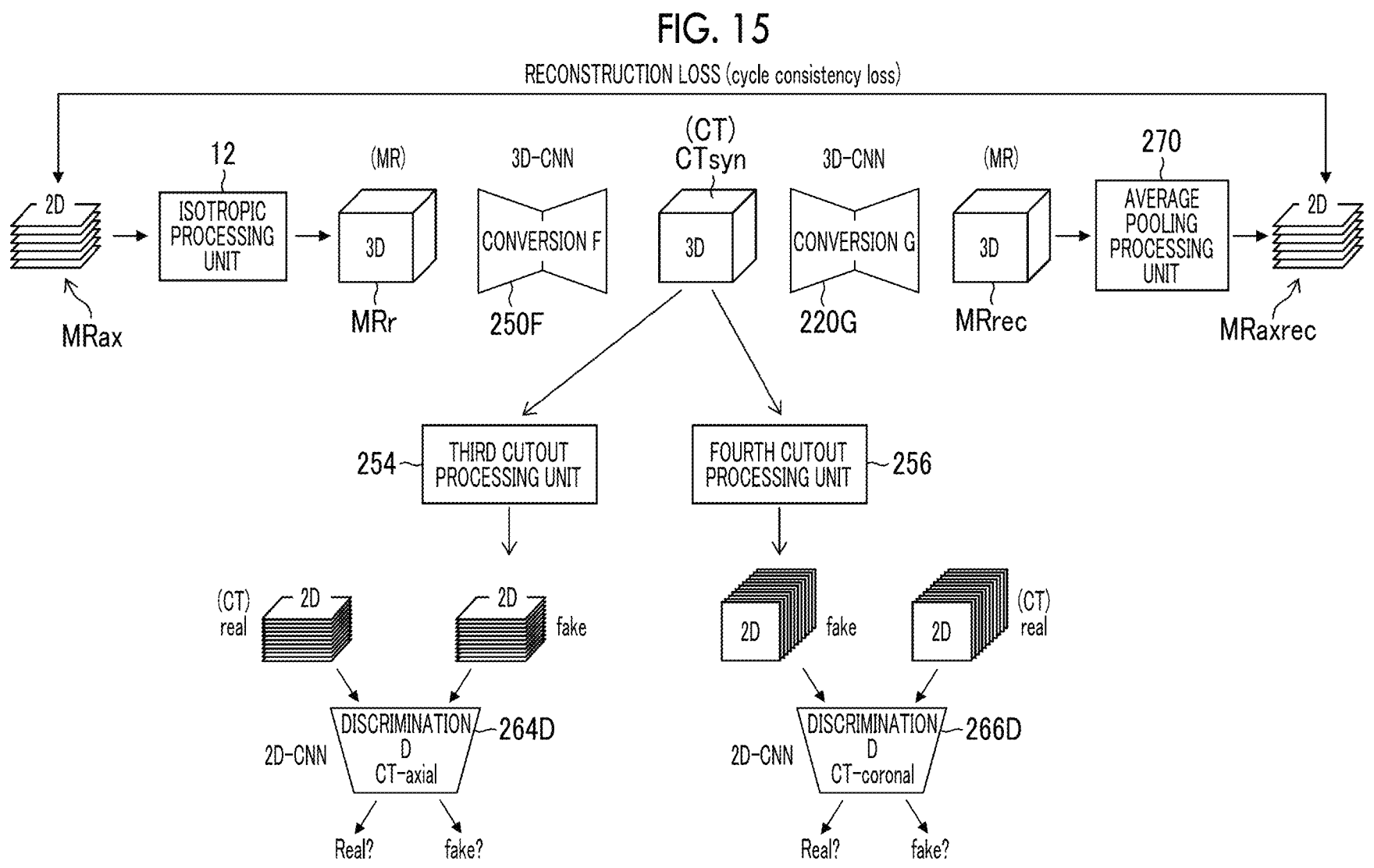
Figure 16:
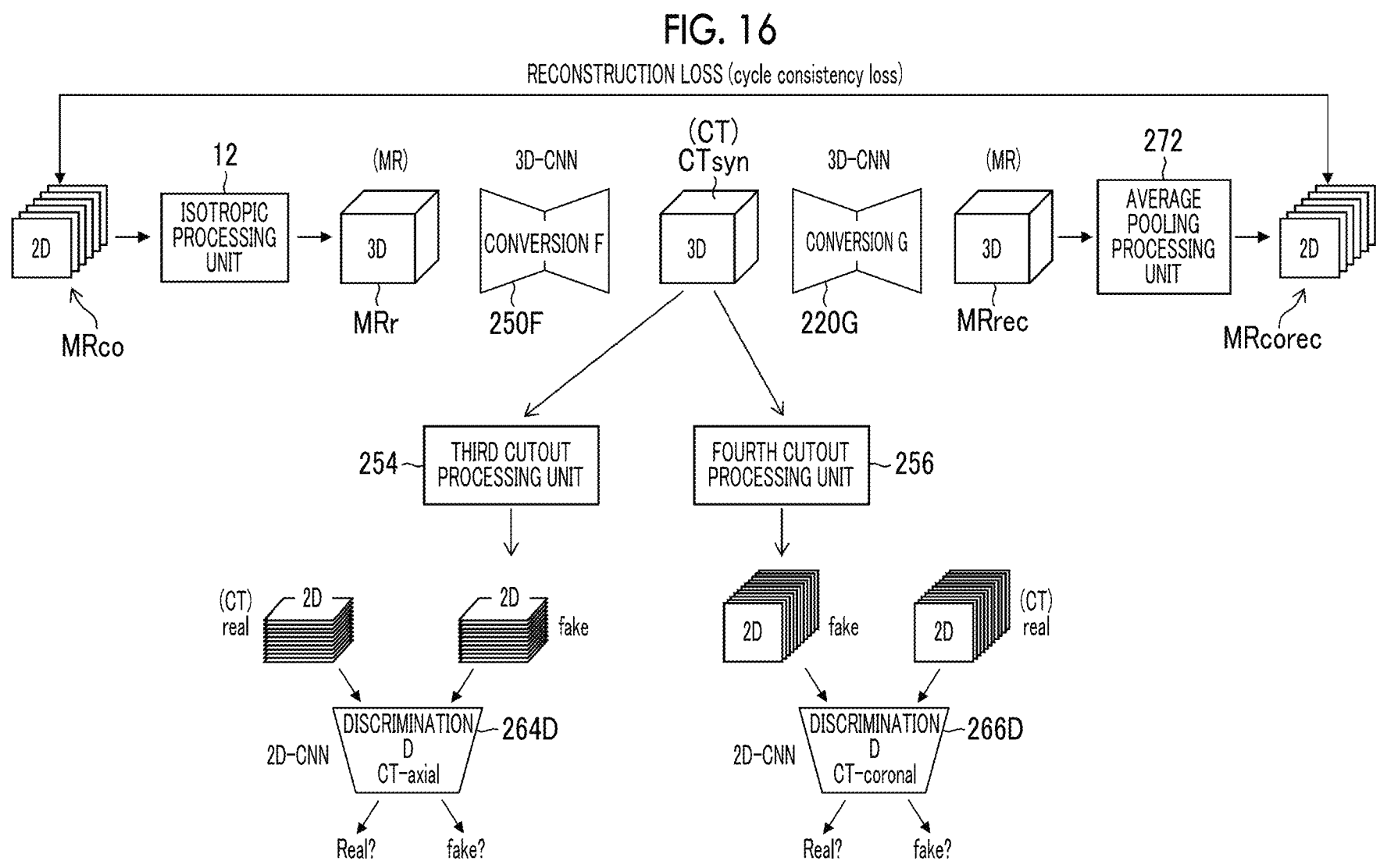

For the reconstruction loss through MR-to-CT-to-MR conversion, the difference between the reconstructed MR image MRrec and the original MR image MRr may be calculated as in FIG. 13, but as illustrated in FIGS. 15 and 16, it is preferable to perform average pooling processing on the reconstructed MR image MRrec, convert the image into the same size as that of the MR image (before being made isotropic) of the thick slice used for input, and calculate an error (reconstruction loss) from the original MR image (before being made isotropic). The reconstruction loss is an example of a "second reconstruction loss" according to the embodiment of the present disclosure.

The reconstructed MR image MRrec generated by the conversion processing using the second generator 250F and the first generator 220G in this order is an example of a "second reconstructed generated image" according to the embodiment of the present disclosure.

FIG. 15 illustrates an example of a case in which an MR image MRax of a thick slice of which the axial cross section is a high resolution is input. The machine learning system 210 comprises an average pooling processing unit 270. The average pooling processing unit 270 performs average pooling processing in the z-axis direction on the isotropic resolution reconstructed MR images MRrec output from the first generator 220G to restore it to the three-dimensional data with the same slice interval as the original MR image MRax used for input. The reconstruction loss is calculated by comparing a reconstructed MR image MRaxrec output from the average pooling processing unit 270 with the original MR image MRax.

FIG. 16 illustrates an example of a case in which an MR image MRco of a thick slice of which the coronal cross section has a high resolution is input. The machine learning system 210 further comprises an average pooling processing unit 272. The average pooling processing unit 272 performs average pooling processing in the y-axis direction on the isotropic resolution reconstructed MR images MRrec output from the first generator 220G to restore it to the three-dimensional data with the same slice interval as the original MR image MRco used for input. The reconstruction loss is calculated by comparing a reconstructed MR image MRcorec output from the average pooling processing unit 270 with the original MR image MRco.

The average pooling processing units 270 and 272 may be provided between the second generator 250F and the error calculation unit 246 in FIG. 12, or may be incorporated into the error calculation unit 246.

For the CT-to-MR conversion described in FIG. 13, in a case where the three-dimensional data of the thick slices is used as an input CT image, as in FIGS. 15 and 16, the average pooling processing may be performed on the reconstructed CT image CTrec, and the reconstruction loss may be calculated based on the three-dimensional data after the three-dimensional data by the average pooling processing and the three-dimensional data which is the original input image.

The average pooling processing performed on the reconstructed CT image CTrec is an example of a "first average pooling processing" according to the embodiment in the present disclosure. The average pooling processing performed on the reconstructed MR image MRrec is an example of a "second average pooling processing" according to the embodiment in the present disclosure.

Effect of Second Embodiment

By performing training using the machine learning system 210 according to the second embodiment, the first generator 220G can serve as a three-dimensional image converter that acquires the image generation capability of CT-to-MR conversion and generates a high resolution pseudo MR image. The second generator 250F can serve as a three-dimensional image converter that acquires the image generation capability of MR-to-CT conversion and generates a high resolution pseudo CT image.

Figure 17:
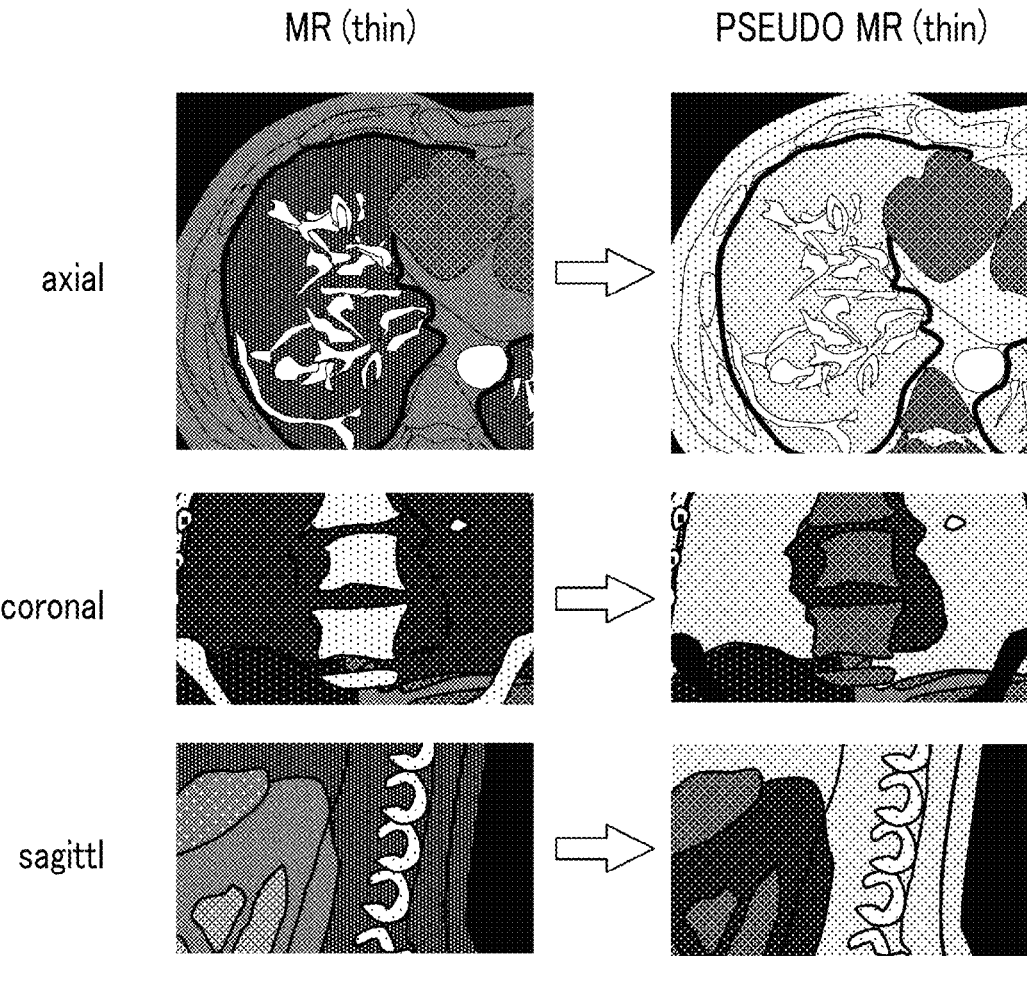
FIG. 17 is an image example illustrating a performance of CT-to-MR conversion by a trained generator obtained by performing training using the machine learning system according to the second embodiment.

FIG. 17 is an image example illustrating a performance of CT-to-MR conversion by the trained first generator 220G obtained by performing training using the machine learning system 210 according to the second embodiment. FIG. 17 is a result of training using a CT dataset of the thin slice and an MR dataset of the thick slice. The MR dataset used for training may include only two types of thick slices of which the axial cross section has a high resolution and thick slices of which the coronal cross section has a high resolution.

The left side in FIG. 17 is an example of an input image, and the right side is an example of an output image (generated image). FIG. 17 illustrates an example of a pseudo MR image generated in a case where an image of the thin slice of CT is input. As illustrated in FIG. 17, even in a situation in which no MR thick slice is trained, the pseudo MR image generated by the trained first generator 220G is a high-definition image having a high resolution in each cross section of the axial cross section, the coronal cross section, and the sagittal cross section.

Figure 18:
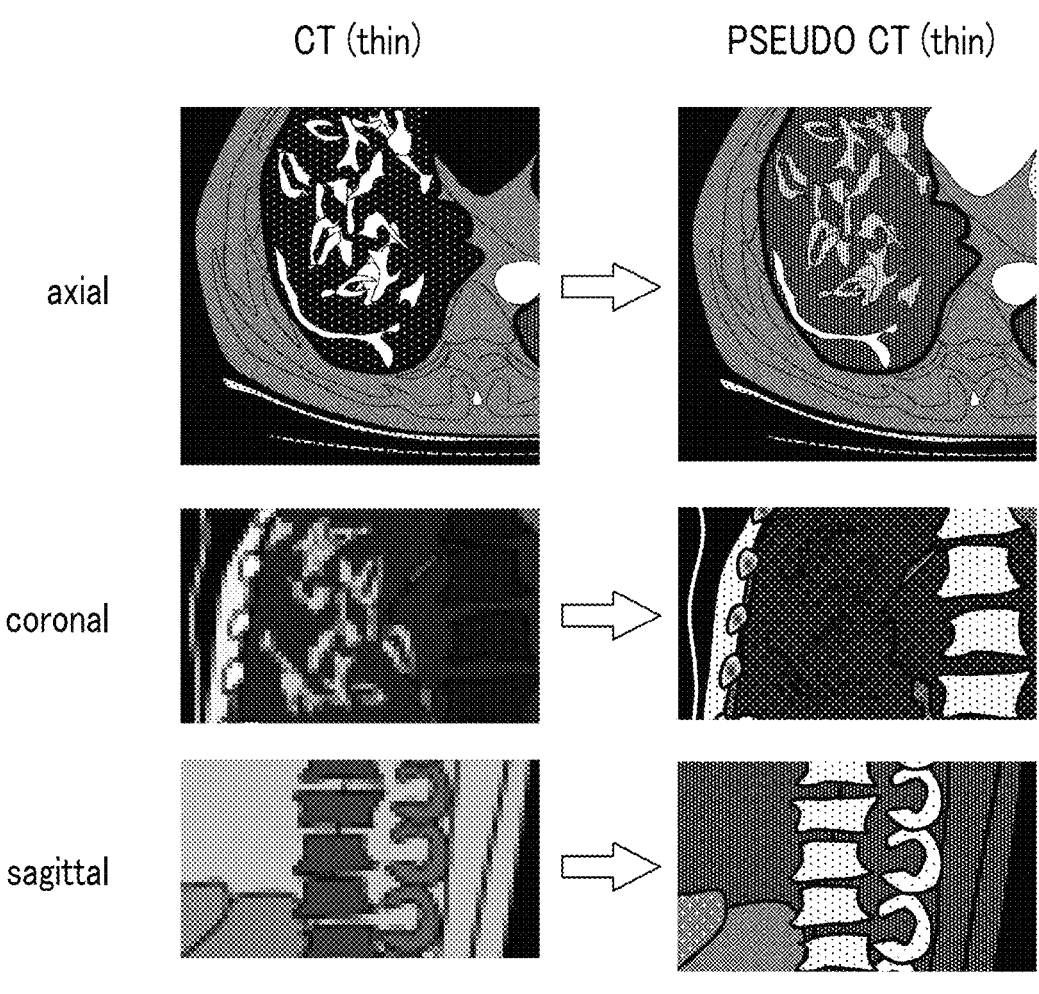
FIG. 18 is an image example illustrating a performance of MR-to-CT conversion by the trained generator obtained by performing training using the machine learning system according to the second embodiment.

FIG. 18 is an image example illustrating a performance of MR-to-CT conversion by the trained second generator 250F obtained by performing training using the machine learning system 210 according to the second embodiment. FIG. 18 illustrates an example of the pseudo CT image obtained in a case where an MR image of a thick slice is input. As illustrated in FIG. 18, the pseudo CT image generated by the trained second generator 250F becomes a high-definition image having a high resolution in each cross section of the axial cross section, the coronal cross section, and the sagittal cross section.

Since the three-dimensional data of the thin slice has a high resolution and a very large capacity, many pieces of data are stored in the database as the thick slice in the medical institution. It is a great advantage in practical use that three-dimensional training capable of generating a high resolution image for each cross section by using thick slice data for image conversion can be performed.

In the above-described second embodiment, an example in which the three-dimensional data in which the axial cross section has a high resolution (the data in which the z-axis direction has a low resolution) and the three-dimensional data in which the coronal cross section has a high resolution (the data in which the y-axis direction has a low resolution) are used as the training data has been described, but as described in Modification Example 2 of the first embodiment, the invention can be similarly applied to a combination of other data types.

Comparative Example

Figure 19:
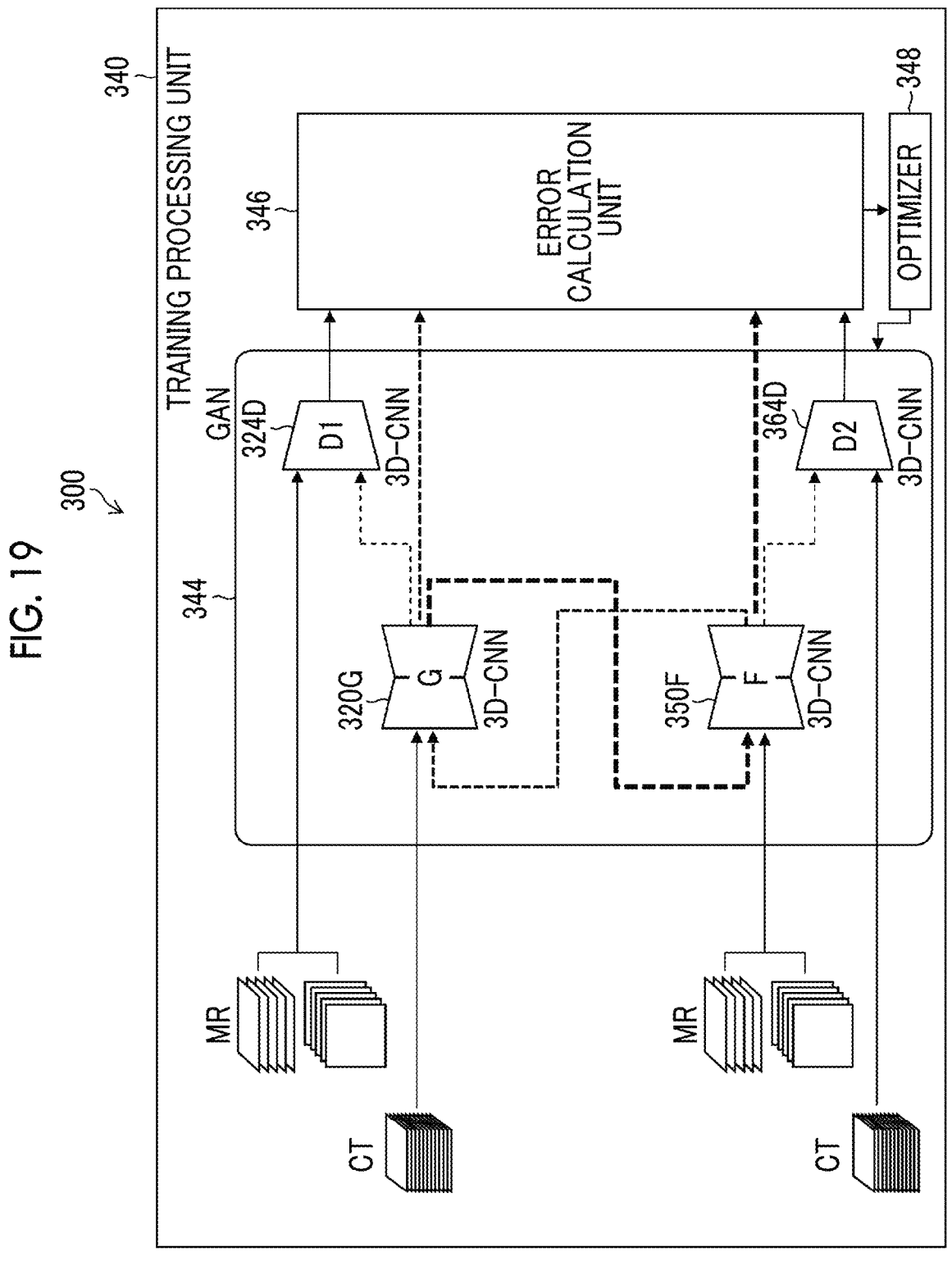
FIG. 19 is a configuration example of a learning model applied to a machine learning system according to Comparative Example.

FIG. 19 is a configuration example of a learning model 344 applied to a machine learning system according to Comparative Example. The learning model 344 is a 3D-CycleGAN extended to a three-dimensional input and output based on the CycleGAN architecture, and includes generators 320G and 350F configured using the three-dimensional CNN and discriminators 324D and 364D configured using the three-dimensional CNN.

The generator 320G is an image generation network that performs CT-to-MR conversion, receives an input of CT three-dimensional data, and outputs MR three-dimensional data. The generator 350F is an image generation network that performs MR-to-CT conversion, receives an input of MR three-dimensional data, and outputs CT three-dimensional data.

The discriminator 324D is a three-dimensional discriminator that receives an input of three-dimensional data of a pseudo MR image generated by the generator 320G or an actual MR image included in the training data and discriminates the authenticity of the image. Similarly, the discriminator 364D is a three-dimensional discriminator that receives an input of three-dimensional data of a pseudo CT image generated by the generator 350F or an actual CT image included in the training data and discriminates the authenticity of the image.

The machine learning system according to Comparative Example includes an error calculation unit and an optimizer, which are not illustrated, in addition to the learning model 344. At the time of training, the pseudo MR image generated by the generator 320G by receiving the input of the actual CT image is input to the generator 350F, MR-to-CT conversion is performed by the generator 350F, and a reconstructed CT image is output from the generator 350F. A reconstruction loss through CT-to-MR-to-CT conversion is evaluated based on the reconstructed CT image and the original actual CT image.

Similarly, the pseudo CT image generated by the generator 350F by receiving the input of the actual MR image is input to the generator 320G, CT-to-MR conversion is performed by the generator 320G, and a reconstructed MR image is output from the generator 320G. A reconstruction loss through MR-to-CT-to-MR conversion is evaluated based on the reconstructed MR image and the original actual MR image.

Figure 20:
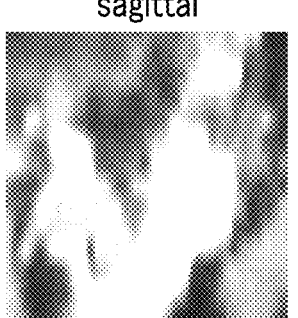
FIG. 20 is an example of a pseudo MR image generated by a generator that has been trained using the machine learning system according to Comparative Example for a task of CT-to-MR conversion.
Figure 20:
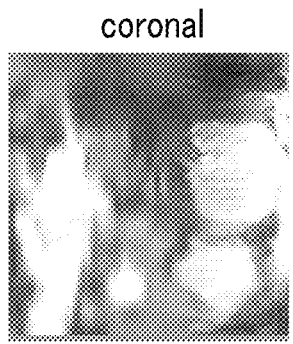
Figure 20:
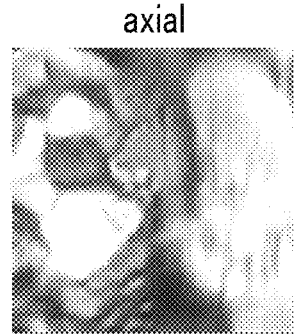

FIG. 20 illustrates an example of a generated image obtained in a case of performing training using the same training dataset as that of the second embodiment as the training data using the machine learning system according to Comparative Example. FIG. 20 is an example of a pseudo MR image generated by a generator that has been trained a task of CT-to-MR conversion. In the case of the machine learning system according to Comparative Example using the three-dimensional discriminator, the machine learning system also learns the slice thickness of the domain of the training data at the same time. Therefore, in a case where the MR image used for training is the three-dimensional data of the thick slice, the generated image reproduces the image expression of the thick slice, the image quality in each cross section is low, and thus it is difficult to generate a high-definition image.

In this regard, according to the methods described in the first embodiment and the second embodiment, even in a case where the three-dimensional data of the thick slice is used for training, it is possible to generate an image in which a high-definition image is obtained in each cross section.

Configuration Example of Machine Learning System

FIG. 21 is a block diagram illustrating a configuration example of an information processing apparatus 400 applied to the machine learning systems 10 and 210. The information processing apparatus 400 comprises a processor 402, a non-transitory tangible computer-readable medium 404, a communication interface 406, an input-output interface 408, a bus 410, an input device 414, and a display device 416. The processor 402 is an example of a "first processor" according to the embodiment of the present disclosure. The computer-readable medium 404 is an example of a "first storage device" according to the embodiment of the present disclosure.

The processor 402 includes a central processing unit (CPU). The processor 402 may include a graphics processing unit (GPU). The processor 402 is connected to the computer-readable medium 404, the communication interface 406, and the input-output interface 408 via the bus 410. The input device 414 and the display device 416 are connected to the bus 410 via the input-output interface 408.

The computer-readable medium 404 includes a memory that is a main memory, and a storage that is an auxiliary storage device. For example, the computer-readable medium 404 may be a semiconductor memory, a hard disk drive (HDD) device, or a solid state drive (SSD) device, or a combination of a plurality thereof.

The information processing apparatus 400 is connected to an electric communication line (not illustrated) via the communication interface 406. The electric communication line may be a wide area communication line, a private communication line, or a combination thereof.

The computer-readable medium 404 stores a plurality of programs for performing various types of processing, data, and the like. The computer-readable medium 404 stores, for example, an isotropic processing program 420, a posture conversion program 422, a fixed-size region cutout processing program 424, and a training processing program 430. The training processing program 430 includes the learning model 244, an error calculation program 436, and a parameter update program 438.

By executing instructions of the programs via the processor 402, the information processing apparatus 400 including the processor 402 functions as processing units corresponding to the programs. For example, by executing instructions of the isotropic processing program 420 via the processor 402, the processor 402 functions as the isotropic processing unit 12 that performs isotropic processing. In addition, by executing instructions of the training processing program 430 via the processor 402, the processor 402 functions as the training processing units 40 and 240 that perform training processing. The same applies to the other programs.

In addition, the computer-readable medium 404 stores a display control program (not illustrated). The display control program generates a display signal necessary for a display output to the display device 416 and performs a display control of the display device 416.

For example, the display device 416 is composed of a liquid crystal display, an organic electro-luminescence (OEL) display, or a projector, or an appropriate combination thereof. For example, the input device 414 is composed of a keyboard, a mouse, a multi-touch panel, other pointing devices, a voice input device, or an appropriate combination thereof. The input device 414 receives various inputs from an operator.

Example of Medical Image Processing Apparatus
Using Trained Model

Figure 22:
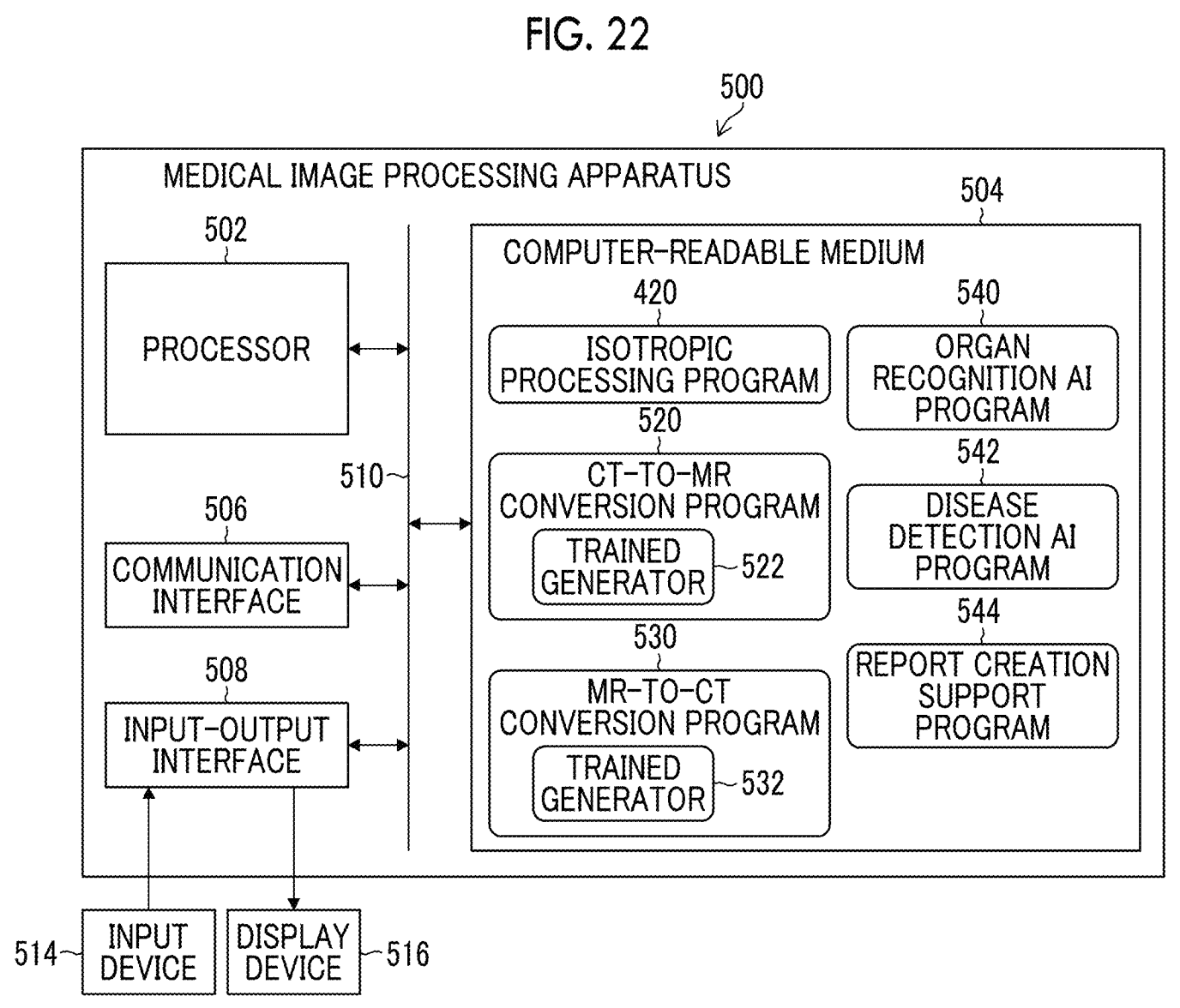

FIG. 22 is a block diagram illustrating an example of a hardware configuration of a medical image processing apparatus 500 to which a trained model generated by performing training processing using the machine learning systems 10 and 210 is applied.

The medical image processing apparatus 500 comprises a processor 502, a non-transitory tangible computer-readable medium 504, a communication interface 506, an input-output interface 508, a bus 510, an input device 514, and a display device 516.

The hardware configurations of the processor 502, the computer-readable medium 504, the communication interface 506, the input-output interface 508, the bus 510, the input device 514, the display device 516, and the like may be the same as the corresponding elements of the processor 402, the computer-readable medium 404, the communication interface 406, the input-output interface 408, the bus 410, the input device 414, and the display device 416 in the information processing apparatus 400 described in FIG. 21. The processor 502 is an example of a "second processor" according to the embodiment of the present disclosure. The "computer-readable medium 504" is an example of a "second storage device" according to the embodiment of the present disclosure.

The computer-readable medium 504 of the medical image processing apparatus 500 stores at least one of a CT-to-MR conversion program 520 or an MR-to-CT conversion program 530. The CT-to-MR conversion program 520 includes a trained generator 522 that has been trained CT-to-MR domain conversion. The trained generator 522 is a trained model corresponding to the generator 20G in FIG. 5 or the first generator 220G in FIG. 12. The trained generator 522 is an example of a "first trained model" according to the embodiment of the present disclosure. The CT image input to the first generator 220G is an example of a "first medical image" according to the embodiment of the present disclosure. The pseudo MR image output from the first generator 220G is an example of a "second medical image" according to the embodiment of the present disclosure. The pseudo MR image output from the trained generator 522 is an example of the "second medical image" according to the embodiment of the present disclosure.

The MR-to-CT conversion program 530 includes a trained generator 532 that has been trained MR-to-CT domain conversion. The trained generator 532 is a trained model corresponding to the second generator 250F in FIG. 12.

The computer-readable medium 504 may further include at least one program of the isotropic processing program 420, an organ recognition AI program 540, a disease detection AI program 542, or a report creation support program 544. The isotropic processing program 420 may be included in each of the CT-to-MR conversion program 520 and the MR-to-CT conversion program 530.

The organ recognition AI program 540 includes a processing module that performs organ segmentation. The organ recognition AI program 540 may include a lung section labeling program, a blood vessel region extraction program, a bone labeling program, and the like.

The disease detection AI program 542 includes a detection processing module corresponding to a specific disease. As the disease detection AI program 542, for example, at least one program of a lung nodule detection program, a lung nodule characteristic analysis program, a pneumonia CAD program, a mammary gland CAD program, a liver CAD program, a brain CAD program, or a colon CAD program may be included.

The report creation support program 544 includes a trained document generation model that generates a medical opinion candidate corresponding to a target medical image.

Various processing programs such as the organ recognition AI program 540, the disease detection AI program 542, and the report creation support program 544 may be AI processing modules including a trained model that is trained to obtain an output of a target task by applying machine learning such as deep learning.

An AI model for CAD can be configured using, for example, various CNNs having a convolutional layer. Input data for the AI model may include, for example, a medical image such as a two-dimensional image, a three-dimensional image, or a motion picture image, and an output from the AI model may be, for example, information indicating a position of a disease region (lesion portion) in the image, information indicating a class classification such as a disease name, or a combination thereof.

An AI model that handles time series data, document data, and the like can be configured, for example, using various recurrent neural networks (RNNs). In the time series data, for example, waveform data of an electrocardiogram is included. In the document data, for example, a medical opinion created by a doctor is included.

The generated image generated by the CT-to-MR conversion program 520 or the MR-to-CT conversion program 530 can be input to at least one program of the organ recognition AI program 540, the disease detection AI program 542, or the report creation support program 544. Accordingly, an AI processing module constructed by a specific modality can be also applied to an image of another modality, thereby expanding the application range.

Third Embodiment

Although an example of the image generation task between heterogeneous modalities has been described as an example of domain conversion, an example of a super-resolution task in which a source domain is a thick slice (that is, low resolution) and a target domain is a thin slice (that is, high resolution) will be described in a third embodiment.

Figure 23:
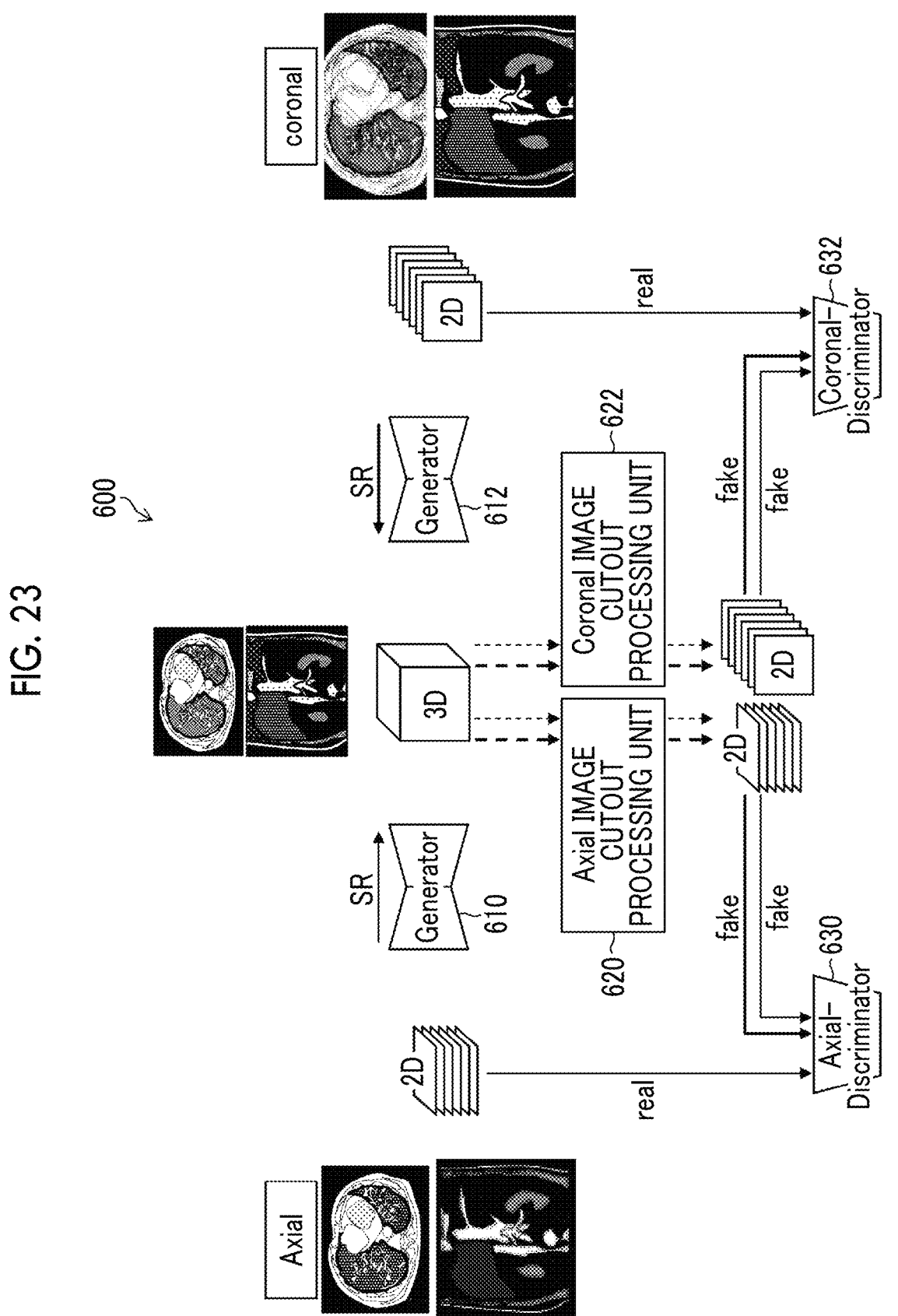
FIG. 23 is a conceptual diagram illustrating an outline of processing of a machine learning system according to a third embodiment.

FIG. 23 is a conceptual diagram illustrating an outline of processing of a machine learning system 600 according to the third embodiment. Here, a method for training a super-resolution image generation task (super-resolution task) for generating a high resolution three-dimensional image from a low resolution three-dimensional image using the MR image as a target will be described.

It is assumed that the low resolution three-dimensional MR images used as an input are an axial image series in which only an axial cross section among three cross sections has a high resolution (other cross sections have low resolutions) and a coronal image series in which only a coronal cross section has a high resolution (other cross sections have low resolutions).

The axial image series is three-dimensional data in which the resolution in the z-axis direction is lower than in the other two axis directions and is understood as a "z-axis direction low resolution image". The coronal image series is three-dimensional data in which the resolution in the y-axis direction is lower than in the other two axis directions and is understood as a "y-axis direction low resolution image". Hereinafter, the axial image series is referred to as an "axial three-dimensional image", and the coronal image series is referred to as a "coronal three-dimensional image". The super resolution in the third embodiment means slice interpolation for interpolating data in the slice thickness direction (axis direction) where the resolution is low.

In the case of the third embodiment, an image pair of the axial three-dimensional image and the coronal three-dimensional image obtained by imaging the same portion of the same patient and performing three-dimensional registration is used as the training data. An image group including a plurality of image pairs in which the axial three-dimensional image and the coronal three-dimensional image are associated with each other is used as the dataset for training.

The machine learning system 600 includes a generator 610 that performs first super-resolution processing, a generator 612 that performs second super-resolution processing, an axial image cutout processing unit 620, a coronal image cutout processing unit 622, a discriminator 630 that discriminates authenticity of an axial image, and a discriminator 632 that discriminates authenticity of a coronal image.

Each of the generators 610 and 612 is a generation network configured using the three-dimensional CNN. The network structure of each of the generators 610 and 612 may be the same as that of the generator 20 in the first embodiment. Each of the discriminators 630 and 632 is a discrimination network configured using the two-dimensional CNN. The network structure of each of the discriminators 630 and 632 may be the same as that of the discriminators 24D and 26D in the first embodiment.

The first super-resolution processing includes processing of super-resolution in the z-axis direction. The generator 610 receives an input of the axial three-dimensional image and outputs a three-dimensional generated image having an isotropic resolution. The second super-resolution processing includes processing of super-resolution in the y-axis direction. The generator 612 receives an input of the coronal three-dimensional image and outputs a three-dimensional generated image having an isotropic resolution. The notation of "SR" in the figure represents processing of super resolution.

The axial image cutout processing unit 620 performs cutout processing of extracting a two-dimensional image of the axial cross section from a three-dimensional generated image SRsyn generated by the generator 610 or the generator 612. The coronal image cutout processing unit 622 performs cutout processing of extracting a two-dimensional image of the coronal cross section from a three-dimensional generated image SRsyn generated by the generator 610 or the generator 612.

The discriminator 630 receives an input of a two-dimensional image extracted from the three-dimensional generated image SRsyn by the axial image cutout processing unit 620 or a two-dimensional image that is a slice image of an axial three-dimensional image included in the training dataset, and performs authenticity discrimination of whether the image is a real image or a fake image.

The discriminator 632 receives an input of a two-dimensional image extracted from the three-dimensional generated image SRsyn by the coronal image cutout processing unit 622 or a two-dimensional image that is a slice image of a coronal three-dimensional image included in the training dataset, and performs authenticity discrimination of whether the image is a real image or a fake image.

In a case where the axial three-dimensional image is input to the generator 610, the three-dimensional generated image generated by the first super-resolution processing by the generator 610 is cut out in the coronal cross section direction, and an error (absolute error) from a coronal image of a correct answer is calculated.

On the other hand, in a case where the coronal three-dimensional image is input to the generator 612, the three-dimensional generated image generated by the second super-resolution processing by the generator 612 is cut out in the axial cross section direction, and an error (absolute error) from an axial image of a correct answer is calculated.

The machine learning system 600 repeats the adversarial training for the generators 610 and 612 and the discriminators 630 and 632 to improve the performance of both.

By performing training using the machine learning system 600 according to the third embodiment, it is possible to obtain the trained generator 610 that generates a high-definition three-dimensional image having an isotropic resolution from a low resolution axial three-dimensional image and the trained generator 612 that generates a high-definition three-dimensional image having an isotropic resolution from a low-resolution coronal three-dimensional image.

The axial three-dimensional image used for training in the third embodiment is an example of a "three-dimensional image captured under a first imaging condition" according to the embodiment of the present disclosure, and the coronal three-dimensional image is an example of a "three-dimensional image captured under a second imaging condition" according to the embodiment of the present disclosure. The z-axis direction in the axial three-dimensional image is an example of a "first axis direction" according to the embodiment of the present disclosure, and the axial three-dimensional image is an example of "first axis low resolution three-dimensional data" according to the embodiment of the present disclosure. The y-axis direction in the sagittal three-dimensional image is an example of a "second axis direction" according to the embodiment of the present disclosure, and the sagittal three-dimensional image is an example of "second axis low resolution three-dimensional data" according to the embodiment of the present disclosure.

Fourth Embodiment

Figure 24:
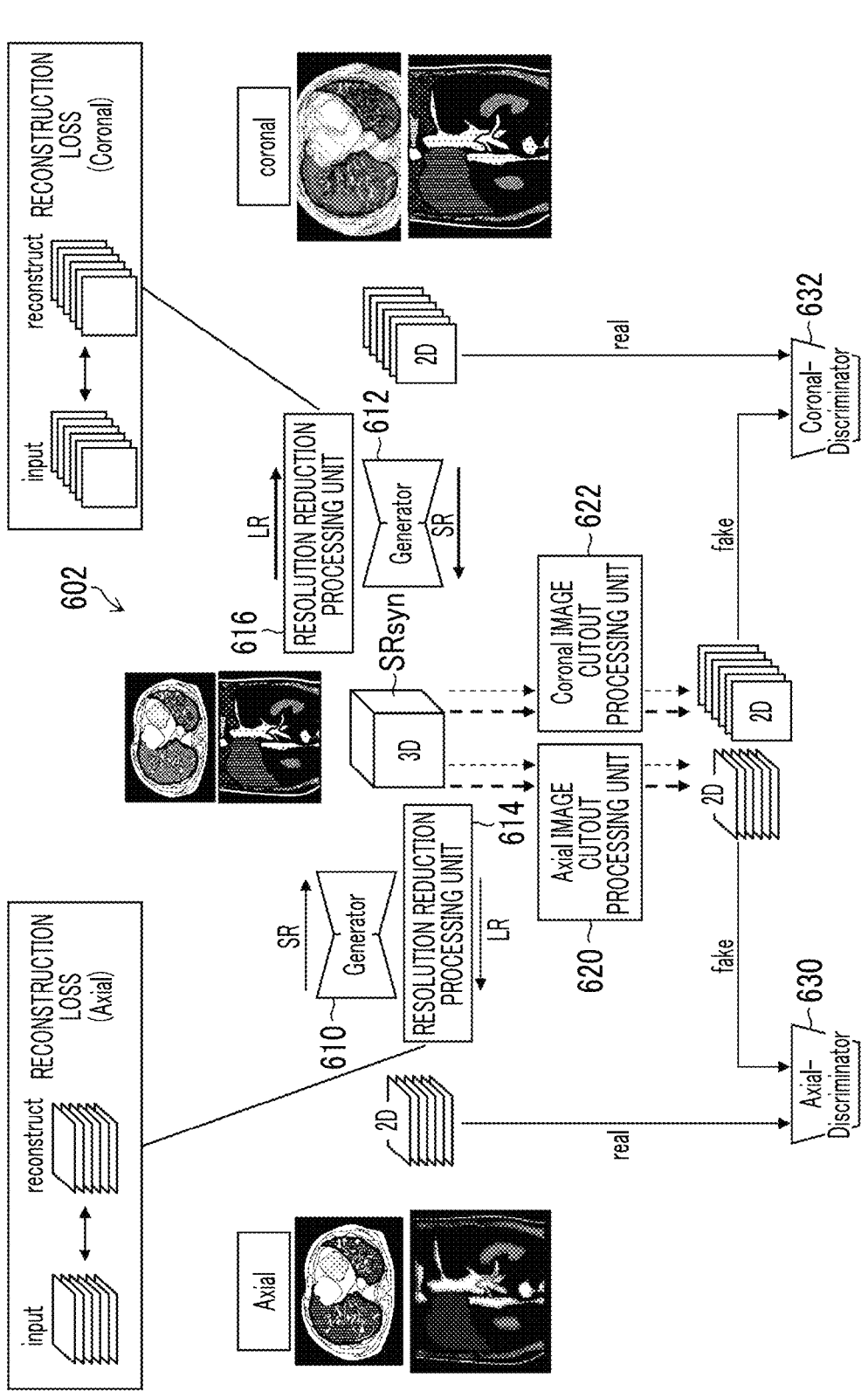
FIG. 24 is a conceptual diagram illustrating an outline of processing in a machine learning system according to a fourth embodiment.

FIG. 24 is a conceptual diagram illustrating an outline of processing in a machine learning system 602 according to a fourth embodiment. In FIG. 24, elements that are the same as or similar to those in the configuration illustrated in FIG. 23 are denoted by the same reference numerals, and redundant descriptions thereof will be omitted. Regarding the configuration illustrated in FIG. 24, points different from FIG. 23 will be described.

In the third embodiment, an example in which the authenticity discrimination is performed on the three-dimensional generated image SRsyn generated by the generator 610 or the generator 612 by using the two discriminators 630 and 632 has been described, but in the fourth embodiment, processing of reducing the resolution of the three-dimensional generated image is added to the architecture of the third embodiment, a mechanism of evaluating the reconstruction loss through the conversion processing in which the super-resolution processing and the resolution reduction processing corresponding to the inverse conversion thereof are performed in this order is incorporated, and any one discriminator of the discriminator 630 or the discriminator 632 is used for the three-dimensional generated image.

The machine learning system 602 illustrated in FIG. 24 includes a resolution reduction processing unit 614 that performs resolution reduction processing in the z-axis direction on the three-dimensional generated image SRsyn and a resolution reduction processing unit 616 that performs the resolution reduction processing in the y-axis direction on the three-dimensional generated image SRsyn.

The resolution reduction by the resolution reduction processing unit 614 corresponds to inverse conversion processing with respect to the first super-resolution processing of the generator 610. By performing the first super-resolution processing of the generator 610 and the resolution reduction processing of the resolution reduction processing unit 614 in this order, a reconstructed generated image (axial three-dimensional reconstructed generated image) corresponding to the axial three-dimensional image used as for input is obtained. The machine learning system 602 evaluates the reconstruction loss based on the axial three-dimensional image which is the original input image and the axial three-dimensional reconstructed generated image and updates the parameters of the generator 610. The notation of "LR" in the figure represents processing for making a low resolution.

Similarly, the resolution reduction by the resolution reduction processing unit 616 corresponds to inverse conversion processing for the second super-resolution processing of the generator 612, and by performing the super-resolution processing of the generator 612 and the resolution reduction processing of the resolution reduction processing unit 616 in this order, a reconstructed generated image (coronal three-dimensional reconstructed generated image) corresponding to the coronal three-dimensional image used for input is obtained. The machine learning system 602 evaluates a reconstruction loss based on the coronal three-dimensional image which is the original input image and the coronal three-dimensional reconstructed generated image and updates the parameters of the generator 612.

In the case of the fourth embodiment, the configuration is similar to the CycleGAN mechanism, the pair relationship between the axial three-dimensional image and the coronal three-dimensional image used for training is not necessary, and respective training data groups of the image group of the axial three-dimensional image and the image group of the coronal three-dimensional image may be present. In the fourth embodiment, the configuration includes repeatedly training on an axial three-dimensional image and a coronal three-dimensional image which are given randomly.

Figure 25:
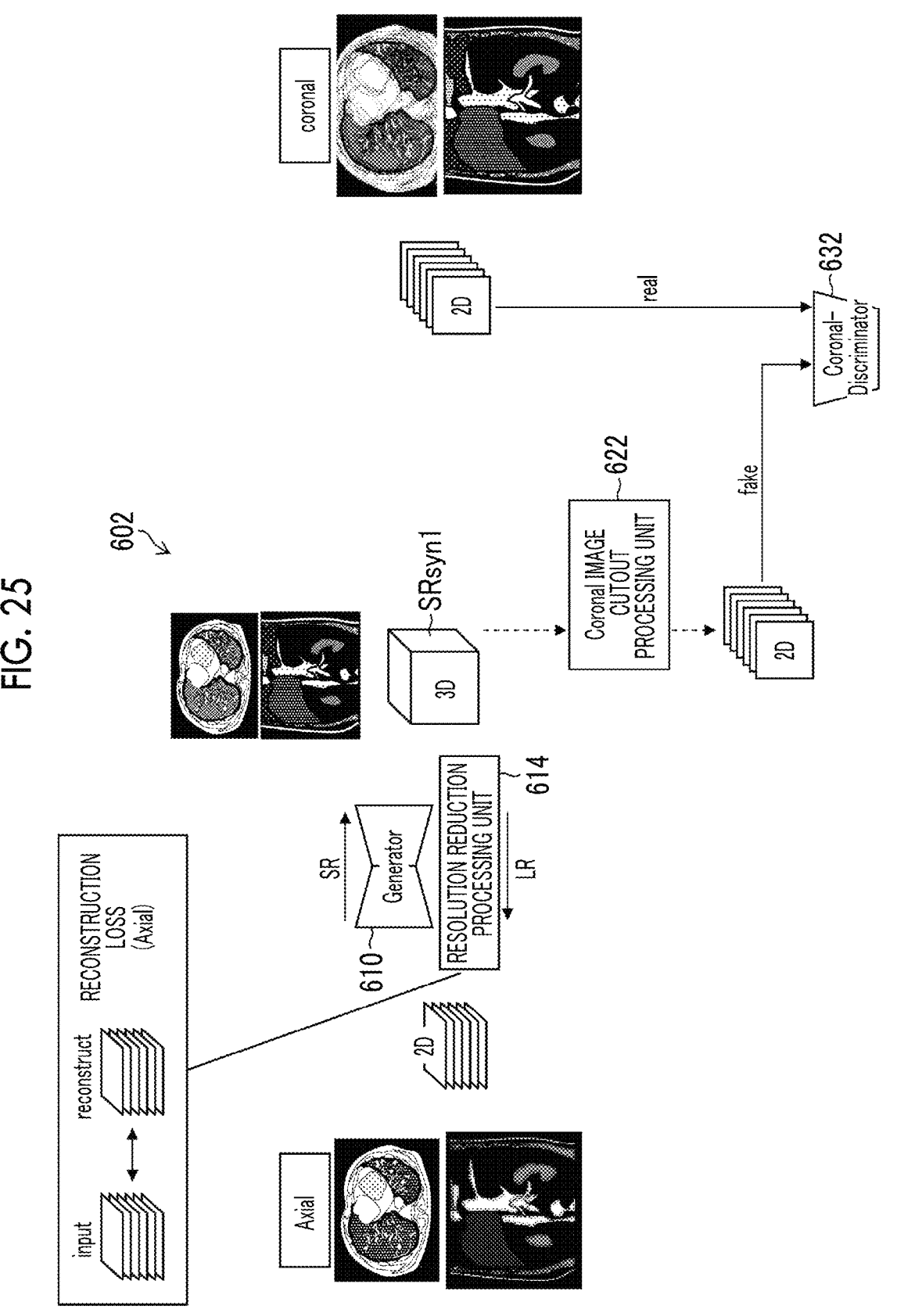
FIG. 25 is a schematic diagram illustrating a processing flow in a case where a three-dimensional image of which an axial cross section has a high resolution is input in the machine learning system according to the fourth embodiment.

FIG. 25 is a processing flow in a case where an axial three-dimensional image is input in the machine learning system 602. The axial three-dimensional image is input to the generator 610, and a three-dimensional generated image SRsyn1 is output from the generator 610. The resolution reduction processing unit 614 performs resolution reduction on the three-dimensional generated image SRsyn1, generates an axial three-dimensional reconstructed generated image, and calculates a reconstruction loss.

In addition, in a case where the axial three-dimensional image is input to the generator 610, a two-dimensional image of the coronal cross section is cut out from the three-dimensional generated image SRsyn1 output from the generator 610, and the authenticity of the coronal image is discriminated using the discriminator 632. The machine learning system 602 repeats the adversarial training for the generator 612 and the discriminator 632 to improve performance of both.

Figure 26:
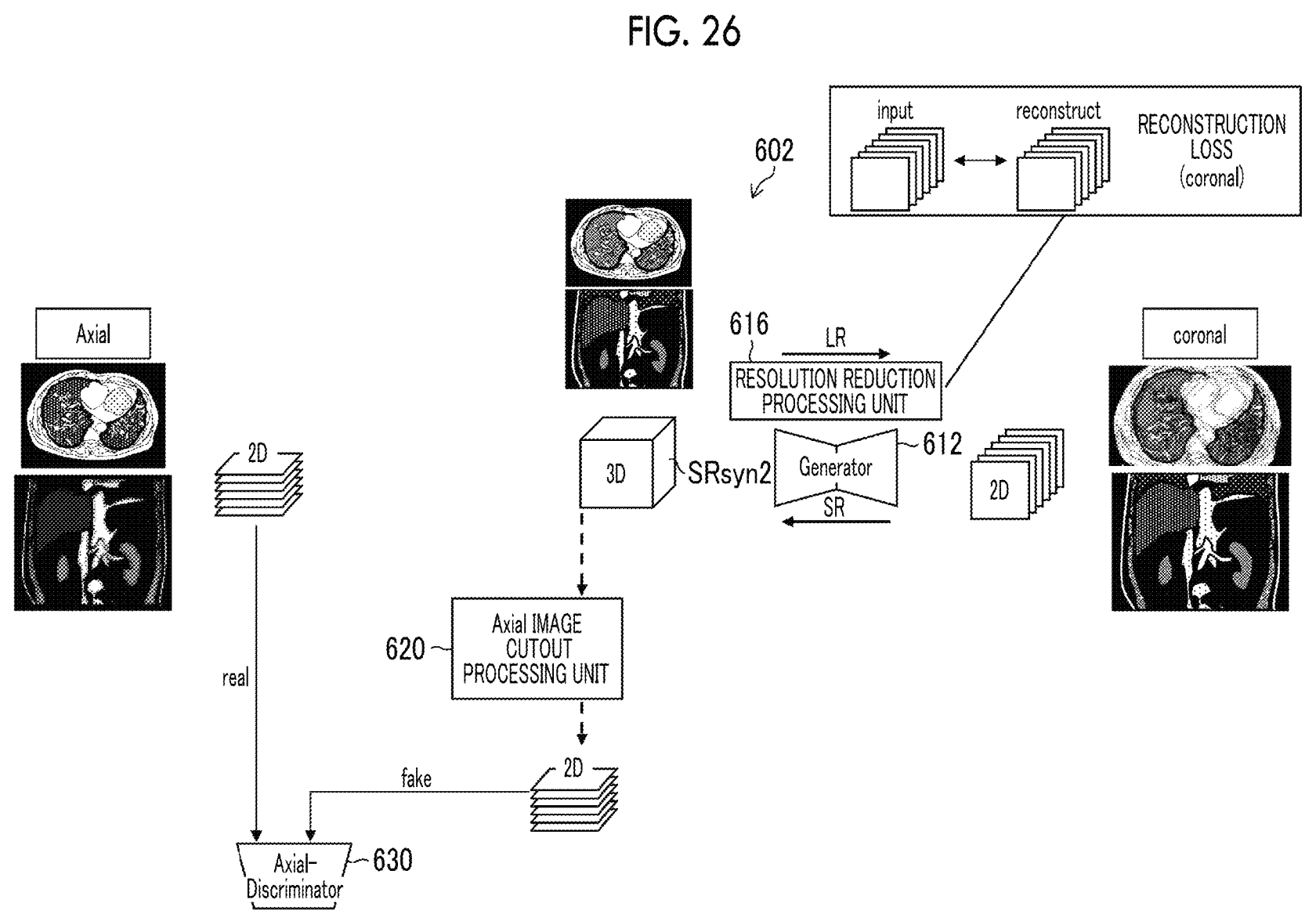

FIG. 26 is a processing flow in a case where a coronal three-dimensional image is input in the machine learning system 602. The coronal three-dimensional image is input to the generator 612, and a three-dimensional generated image SRsyn is output from the generator 612. The resolution reduction processing unit 616 performs resolution reduction on the three-dimensional generated image SRsyn2, generates a coronal three-dimensional reconstructed generated image, and calculates a reconstruction loss.

In addition, in a case where the coronal three-dimensional image is input to the generator 612, a two-dimensional image of the axial cross section is cut out from the three-dimensional generated image SRsyn2 output from the generator 612, and the authenticity of the axial image is discriminated using the discriminator 630. The machine learning system 602 repeats the adversarial training for the generator 612 and the discriminator 630 to improve performance of both.

By performing training using the machine learning system 602 according to the fourth embodiment, it is possible to obtain the trained generator 610 that generates a high-definition three-dimensional image having an isotropic resolution from a low resolution axial three-dimensional image and the trained generator 612 that generates a high-definition three-dimensional image having an isotropic resolution from a low resolution coronal three-dimensional image.

Modification Example 3

It is not necessary to perform both the processing flow of super resolution on an axial three-dimensional image illustrated in FIG. 25 and the processing flow of super resolution on a coronal three-dimensional image illustrated in FIG. 26. For example, in a case where only a super-resolution task using the axial three-dimensional image as an input is implemented, training can be performed only by the processing flow of FIG. 25.

Modification Example 4

As another example of the domain conversion, the technology of the present disclosure can also be applied to conversion between different image types such as the T1 weighted image, the T2 weighted image, a fat-suppressed image, a contrast image, and a non-contrast image in MR, or also applied to conversion between a contrast image and a non-contrast image in CT.

About Type of Three-dimensional Image

The technology of the present disclosure is not limited to the CT image and the MR image, and various medical images such as an ultrasound image for projecting human body information and a positron emission tomography (PET) image captured using a PET apparatus are included in the application range. The technology of the present disclosure is not limited to the medical image captured by the medical apparatus, and can be applied to three-dimensional images for various purposes captured by various imaging apparatuses.

Example of Hardware Configuration of Computer

Figure 27:
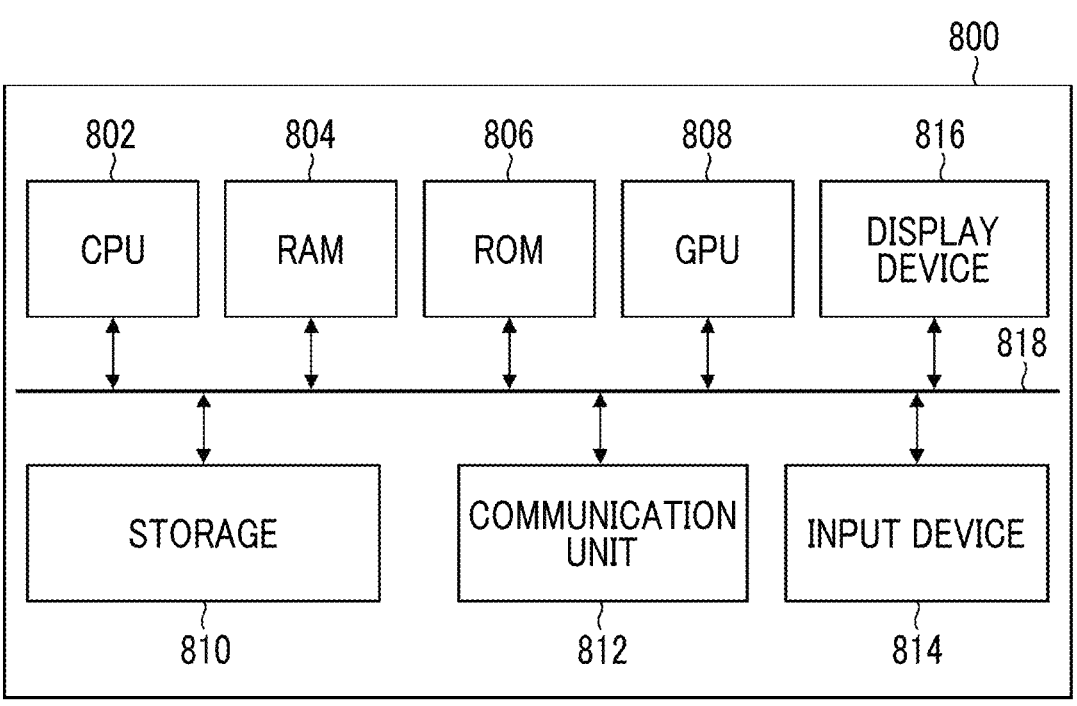
FIG. 27 is a block diagram illustrating an example of a hardware configuration of a computer.

FIG. 27 is a block diagram illustrating an example of a hardware configuration of the computer. A computer 800 may be a personal computer, a workstation, or a server computer. The computer 800 can be used as an apparatus that comprises a part or all of any of the machine learning systems 10, 11, 210, 600, and 602 and the medical image processing apparatus 500 described above, or that has a plurality of functions thereof.

The computer 800 comprises a CPU 802, a random access memory (RAM) 804, a read only memory (ROM) 806, a GPU 808, a storage 810, a communication unit 812, an input device 814, a display device 816, and a bus 818. The GPU 808 may be provided as needed.

The CPU 802 reads out various programs stored in the ROM 806, the storage 810, or the like and performs various types of processing. The RAM 804 is used as a work region of the CPU 802. In addition, the RAM 804 is used as a storage unit that transitorily stores the read-out programs and various types of data.

For example, the storage 810 is configured to include a hard disk apparatus, an optical disc, a magneto-optical disk, a semiconductor memory, or a storage device configured using an appropriate combination thereof. The storage 810 stores various programs, data, and the like. By loading the programs stored in the storage 810 into the RAM 804 and performing the programs via the CPU 802, the computer 800 functions as a unit that performs various types of processing defined by the programs.

The communication unit 812 is an interface for performing communication processing with an external apparatus in a wired or wireless manner and exchanging information with the external apparatus. The communication unit 812 can have a role as an information acquisition unit that receives an input of the image and the like.

The input device 814 is an input interface for receiving various operation inputs for the computer 800. For example, the input device 814 may be a keyboard, a mouse, a multi-touch panel, other pointing devices, a voice input device, or an appropriate combination thereof.

The display device 816 is an output interface on which various types of information are displayed. For example, the display device 816 may be a liquid crystal display, an organic electro-luminescence (OEL) display, a projector, or an appropriate combination thereof.

About Program for Operating Computer

A program that causes the computer to implement a part or all of at least one processing function of various processing functions such as an image acquisition function, a preprocessing function, and training processing function in the machine learning systems 10, 11, 210, 600, and 602, and an image processing function in the medical image processing apparatus 500 described in the above-described embodiment can be recorded on a computer-readable medium that is an optical disc, a magnetic disk, a semiconductor memory, or another non-transitory tangible information storage medium, and the program can be provided via the information storage medium.

In addition, instead of an aspect of providing the program by storing the program in the non-transitory tangible computer-readable medium, a program signal can be provided as a download service by using an electric communication line such as the Internet.

Further, at least one processing function among various processing functions such as the image acquisition function, the preprocessing function, and the training processing function in the machine learning systems 10, 11, 210, 600, and 602 and the image processing function in the medical image processing apparatus 500 may be implemented by cloud computing or may be provided as a software as a service (SaaS) service.

About Hardware Configuration of Each Processing Unit

The hardware structures of processing units performing various processing, such as the isotropic processing unit 12, the generator 20G, the first cutout processing unit 14, the second cutout processing unit 16, the cutout processing unit 18, the discriminators 24D, 26D, and 28D, the training data generation unit 30, the posture conversion unit, the fixed-size region cutout processing unit 34, the training processing unit 40, the image acquisition unit 42, the error calculation units 46 and 246, the optimizers 48 and 248, the preprocessing unit 230, the first generator 220G, the second generator 250F, the third cutout processing unit 254, the fourth cutout processing unit 256, the first discriminator 224D, the second discriminator 226D, the third discriminator 264D, the fourth discriminator 266D, the average pooling processing units 270 and 272, the generators 610 and 612, the discriminators 630 and 632, the axial image cutout processing unit 620, the coronal image cutout processing unit 622, and the resolution reduction processing units 614 and 616, are, for example, various processors described below.

The various processors include a CPU that is a general-purpose processor functioning as various processing units by executing a program, a GPU that is a processor specialized in image processing, a programmable logic device (PLD) such as a field programmable gate array (FPGA) that is a processor of which a circuit configuration can be changed after manufacture, a dedicated electric circuit such as an application specific integrated circuit (ASIC) that is a processor having a circuit configuration dedicatedly designed to execute specific processing, and the like.

One processing unit may be composed of one of the various processors or may be composed of two or more processors of the same type or heterogeneous types. For example, one processing unit may be composed of a plurality of FPGAs, a combination of a CPU and an FPGA, or a combination of a CPU and a GPU. In addition, a plurality of processing units may be composed of one processor. Examples of the plurality of processing units composed of one processor include, first, as represented by a computer such as a client or a server, a form in which one processor is composed of a combination of one or more CPUs and software, and this processor functions as the plurality of processing units. Second, as represented by a system on chip (SoC) or the like, a form of using a processor that implements functions of the whole system including the plurality of processing units via one integrated circuit (IC) chip is included. Accordingly, various processing units are configured using one or more of the various processors as a hardware structure.

Further, the hardware structure of the various processors is more specifically an electric circuit (circuitry) in which circuit elements such as semiconductor elements are combined.

Other

Configurations of the embodiment of the present invention described above can be appropriately changed, added, or removed without departing from the gist of the present invention. The present invention is not limited to the embodiment described above and can be subjected to many modifications by those having ordinary knowledge in the field within the technical idea of the present invention.

EXPLANATION OF REFERENCES

10, 11: machine learning system
12: isotropic processing unit
14: first cutout processing unit 16: second cutout processing unit
18: cutout processing unit
20G: generator
24D: discriminator
26D, 28D: discriminator
30: training data generation unit
32: posture conversion unit
34: fixed-size region cutout processing unit
40 training processing unit
42: image acquisition unit
44: learning model
46: error calculation unit
48: optimizer
50: image storage unit
54: training data storage unit
100: machine learning system
112: isotropic processing unit
120F: generator
124D: discriminator
210: machine learning system
220G: first generator
224D: first discriminator
226D: second discriminator
230: preprocessing unit
240: training processing unit
244: learning model
246: error calculation unit
248: optimizer
250F: second generator
254: third cutout processing unit
256: fourth cutout processing unit
264D: third discriminator
266D: fourth discriminator
270, 272: average pooling processing unit
320G: generator
324D: discriminator
344: learning model
350F: generator
364D: discriminator
400: information processing apparatus
402: processor
404: computer-readable medium
406: communication interface
408: input-output interface
410: bus
414: input device
416: display device
420: isotropic processing program
422: posture conversion program
424: fixed-size region cutout processing program
430: training processing program
436: error calculation program
438: parameter update program
500: medical image processing apparatus
502: processor
504: computer-readable medium
506: communication interface
508: input-output interface
510: bus
514: input device
516: display device
520: CT-to-MR conversion program
522: trained generator
530: MR-to-CT conversion program
532: trained generator
540: organ recognition AI program
542: disease detection AI program 544: report creation support program
600, 602: machine learning system
610, 612: generator
614, 616: resolution reduction processing unit
620: axial image cutout processing unit
622: coronal image cutout processing unit
630, 632: discriminator
800: computer
802: CPU
804: RAM
806: ROM
808: GPU
810: storage
812: communication unit
814: input device
816: display device
818: bus
CTr: CT image
CTrec: reconstructed CT image
CTsyn: pseudo CT image
MRax: MR image
MRaxrec: reconstructed MR image
MRco: MR image
MRcorec: reconstructed MR image
MRr: MR image
MRrec: reconstructed MR image
MRsyn: pseudo MR image
SRsyn, SRsyn1, and SRsyn2: three-dimensional generated image

What is claimed is:

1. A method of generating a trained model that converts a domain of a three-dimensional image which is input, and outputs a three-dimensional generated image of a different domain, wherein a learning model is used, which has a structure of a generative adversarial network including a first generator configured using a three-dimensional convolutional neural network that receives an input of a three-dimensional image of a first domain and that outputs a three-dimensional generated image of a second domain different from the first domain, and a first discriminator configured using a two-dimensional convolutional neural network that receives an input of a two-dimensional image indicating a cross section image in a first slice plane direction cut out from the three-dimensional generated image of the second domain generated by the first generator and that discriminates authenticity of the input two-dimensional image, and the method comprises:

by a computer, acquiring a plurality of pieces of training data including a three-dimensional image captured under a first imaging condition and a three-dimensional image captured under a second imaging condition different from the first imaging condition; and performing training processing of training the first generator and the first discriminator in an adversarial manner based on the plurality of pieces of training data.

2. The method of generating a trained model according to claim 1, further comprising:

by the computer, performing first cutout processing of cutting out the two-dimensional image indicating the cross section image in the first slice plane direction from the three-dimensional generated image of the second domain generated by the first generator; and inputting the two-dimensional image cut out by the first cutout processing to the first discriminator.

3. The method of generating a trained model according to claim 1, wherein the first imaging condition includes that an apparatus used for imaging is a first imaging apparatus, and the second imaging condition includes that the apparatus used for imaging is a second imaging apparatus of a different type from the first imaging apparatus.

4. The method of generating a trained model according to claim 1, wherein the first imaging condition includes that a resolution condition is a first resolution condition, and the second imaging condition includes that the resolution condition is a second resolution condition different from the first resolution condition.

5. The method of generating a trained model according to claim 1, wherein at least one of the first imaging condition or the second imaging condition includes that a resolution in a direction of one axis among three orthogonal axes is lower than a resolution in each of directions of the other two axes as a resolution condition.

6. The method of generating a trained model according to claim 1, wherein anisotropic three-dimensional data in which a resolution in a direction of one axis among three orthogonal axes is lower than a resolution in each of directions of the other two axes is used as the three-dimensional image captured under the second imaging condition, and the first slice plane direction is a slice plane direction parallel to the directions of the other two axes in which a resolution is relatively high in the anisotropic three-dimensional data.

7. The method of generating a trained model according to claim 1, wherein the learning model further includes a second discriminator configured using the two-dimensional convolutional neural network that receives an input of a two-dimensional image indicating a cross section image in a second slice plane direction orthogonal to the first slice plane direction which is cut out from the three-dimensional generated image of the second domain generated by the first generator and that discriminates authenticity of the input two-dimensional image, and the training processing includes processing of training the first generator and the second discriminator in an adversarial manner.

8. The method of generating a trained model according to claim 7, further comprising:

by the computer, performing second cutout processing of cutting out the two-dimensional image indicating the cross section image in the second slice plane direction from the three-dimensional generated image of the second domain generated by the first generator; and inputting the two-dimensional image cut out by the second cutout processing to the second discriminator.

9. The method of generating a trained model according to claim 7, wherein as the training data, z-axis low resolution aniso-tropic three-dimensional data in which a resolution in a z-axis direction among three orthogonal axes of an x axis, a y axis, and a z axis is lower than a resolution in each of an x-axis direction and a y-axis direction, and y-axis low resolution anisotropic three-dimensional data in which a resolution in the y-axis direction is lower than a resolution in each of the z-axis direction and the x-axis direction are used, the first slice plane direction is a slice plane direction parallel to the x-axis direction and the y-axis direction, and the second slice plane direction is a slice plane direction parallel to the z-axis direction and the x-axis direction.

10. The method of generating a trained model according to claim 7, wherein as the training data, y-axis low resolution aniso-tropic three-dimensional data in which a resolution in a y-axis direction among three orthogonal axes of an x axis, a y axis, and a z axis is lower than a resolution in each of a z-axis direction and an x-axis direction, and x-axis low resolution anisotropic three-dimensional data in which a resolution in the x-axis direction is lower than a resolution in each of the y-axis direction and the z-axis direction are used, the first slice plane direction is a slice plane direction parallel to the z-axis direction and the x-axis direction, and the second slice plane direction is a slice plane direction parallel to the y-axis direction and the z-axis direction.

11. The method of generating a trained model according to claim 7, wherein as the training data, x-axis low resolution aniso-tropic three-dimensional data in which a resolution in an x-axis direction among three orthogonal axes of an x axis, a y axis, and a z axis is lower than a resolution in each of a y-axis direction and a z-axis direction, and z-axis low resolution anisotropic three-dimensional data in which a resolution in the z-axis direction is lower than a resolution in each of the x-axis direction and the y-axis direction are used, the first slice plane direction is a slice plane direction parallel to the y-axis direction and the z-axis direction, and the second slice plane direction is a slice plane direction parallel to the x-axis direction and the y-axis direction.

12. The method of generating a trained model according to claim 7, wherein the computer selectively switches between the first discriminator and the second discriminator which are used for authenticity discrimination of the three-dimensional generated image of the second domain according to a resolution condition of the training data, which is input.

13. The method of generating a trained model according to claim 1, wherein anisotropic three-dimensional data in which a resolution in a direction of one axis among three orthogonal axes is lower than a resolution in each of directions of the other two axes is used as the three-dimensional image captured under the first imaging condition.

14. The method of generating a trained model according to claim 13, further comprising:

by the computer, performing first isotropic processing of converting the three-dimensional image captured under the first imag-ing condition into isotropic three-dimensional data hav-ing an equal resolution in each of axis directions of three orthogonal axes; and inputting the isotropic three-dimensional data after the conversion by the first isotropic processing to the first generator.

15. The method of generating a trained model according to claim 1, wherein the first generator receives an input of isotropic three-dimensional data having an equal resolution in each of axis directions of three orthogonal axes, and outputs the isotropic three-dimensional data as the three-dimensional generated image.

16. The method of generating a trained model according to claim 1, wherein the learning model further includes a second generator configured using the three-dimensional convolutional neural network that receives an input of the three-dimensional image of the second domain and that outputs a three-dimensional generated image of the first domain, and a third discriminator configured using the two-dimensional convolutional neural network that receives an input of a two-dimensional image indicating a cross section image in a specific slice plane direction which is cut out from the three-dimensional generated image of the first domain generated by the second generator and that discriminates authenticity of the input two-dimensional image, and the training processing includes processing of training the second generator and the third discriminator in an adversarial manner.

17. The method of generating a trained model according to claim 16, further comprising:

by the computer, performing third cutout processing of cutting out the two-dimensional image indicating the cross section image in the specific slice plane direction from the three-dimensional generated image of the first domain generated by the second generator; and inputting the two-dimensional image cut out by the third cutout processing to the third discriminator.

18. The method of generating a trained model according to claim 16, further comprising:

by the computer, performing processing of calculating a first reconstruction loss of conversion processing using the first generator and the second generator in this order based on a first reconstructed generated image output from the second generator by inputting the three-dimensional generated image of the second domain output from the first generator to the second generator; and processing of calculating a second reconstruction loss of conversion processing using the second generator and the first generator in this order based on a second reconstructed generated image output from the first generator by inputting the three-dimensional generated image of the first domain output from the second generator to the first generator.

19. The method of generating a trained model according to claim 18, further comprising:

by the computer, performing first average pooling processing of converting the first reconstructed generated image into three-dimensional data having the same resolution as original training data used for the input to the first generator in a case where the first reconstructed generated image is generated; and calculating the first reconstruction loss based on the three-dimensional data after the conversion by the first average pooling processing and the original training data used for the input to the first generator.

20. The method of generating a trained model according to claim 18, further comprising:

by the computer, performing second average pooling processing of converting the second reconstructed generated image into three-dimensional data having the same resolution as original training data used for the input to the second generator in a case where the second reconstructed generated image is generated; and calculating the second reconstruction loss based on the three-dimensional data after the conversion by the second average pooling processing and the original training data used for the input to the second generator.

21. The method of generating a trained model according to claim 16, wherein the learning model further includes a fourth discriminator configured using the two-dimensional convolutional neural network that receives an input of a two-dimensional image indicating a cross section image in a slice plane direction orthogonal to the specific slice plane direction which is cut out from the three-dimensional generated image of the first domain generated by the second generator and that discriminates authenticity of the input two-dimensional image, and the training processing includes processing of training the second generator and the fourth discriminator in an adversarial manner.

22. The method of generating a trained model according to claim 21, further comprising:

by the computer, performing fourth cutout processing of cutting out the two-dimensional image indicating the cross section image in the slice plane direction orthogonal to the specific slice plane direction from the three-dimensional generated image of the first domain generated by the second generator; and inputting the two-dimensional image cut out by the fourth cutout processing to the fourth discriminator.

23. The method of generating a trained model according to claim 21, wherein the specific slice plane direction is the first slice plane direction.

24. The method of generating a trained model according to claim 16, further comprising:

by the computer, performing second isotropic processing of converting the three-dimensional image captured under the second imaging condition into isotropic three-dimensional data having an equal resolution in each of axis directions of three orthogonal axes; and inputting the isotropic three-dimensional data after the conversion by the second isotropic processing to the second generator.

25. The method of generating a trained model according to claim 1, wherein the first imaging condition corresponds to the first domain, and the second imaging condition corresponds to the second domain.

26. The method of generating a trained model according to claim 25, wherein the three-dimensional image captured under the first imaging condition is a first modality image captured using a first modality which is a medical apparatus, the three-dimensional image captured under the second imaging condition is a second modality image captured using a second modality which is a medical apparatus of a different type from the first modality, and the learning model receives an input of the first modality image and is trained to generate a pseudo second modality generated image having a feature of the image captured using the second modality.

27. The method of generating a trained model according to claim 1, wherein the first domain is a first resolution, and the second domain is a second resolution higher than the first resolution.

28. The method of generating a trained model according to claim 27, wherein the three-dimensional image captured under the first imaging condition is first axis low resolution three-dimensional data in which a resolution in a first axis direction among three orthogonal axes is lower than a resolution in each of the other two axis directions, the three-dimensional image captured under the second imaging condition is second axis low resolution three-dimensional data in which a resolution in a second axis direction different from the first axis direction among the three orthogonal axes is lower than a resolution in the other two axis directions, and the learning model receives an input of at least one of the first axis low resolution three-dimensional data or the second axis low resolution three-dimensional data and is trained to generate isotropic three-dimensional data having a higher resolution than that of the input three-dimensional data.

29. The method of generating a trained model according to claim 27, further comprising:

by the computer, performing resolution reduction processing of reducing a resolution of the three-dimensional generated image of the first domain generated by the first generator; and calculating a reconstruction loss of image conversion by super-resolution processing by the first generator and the resolution reduction processing based on a reconstructed generated image obtained by the resolution reduction processing.

30. A machine learning system for training a learning model that converts a domain of a three-dimensional image which is input, and generates a three-dimensional generated image of a different domain, the system comprising:

at least one first processor; and at least one first storage device in which a program executed by the at least one first processor is stored, wherein the learning model having a structure of a generative adversarial network including a first generator configured using a three-dimensional convolutional neural network that receives an input of a three-dimensional image of a first domain and that outputs a three-dimensional generated image of a second domain different from the first domain, and a first discriminator configured using a two-dimensional convolutional neural network that receives an input of a two-dimensional image indicating a cross section image in a first slice plane direction cut out from the three-dimensional generated image of the second domain generated by the first generator and that discriminates authenticity of the input two-dimensional image, and the at least one first processor, by executing an instruction of the program, acquires a plurality of pieces of training data including a three-dimensional image captured under a first imaging condition and a three-dimensional image captured under a second imaging condition different from the first imaging condition, and performs training processing of training the first generator and the first discriminator in an adversarial manner based on the plurality of pieces of training data.

31. A non-transitory, computer-readable tangible recording medium on which a program for causing, when read by a computer, the computer to execute the method of generating a trained model according to claim 1 is recorded.

32. A medical image processing apparatus comprising:

a second storage device that stores a first trained model which is a trained first generator that has been trained by implementing the method of generating a trained model according to claim 1; and a second processor that performs image processing using the first trained model, wherein the first trained model is a model that receives an input of a first medical image and is trained to output a second medical image of a domain different from the first medical image.

* * * * *